(12) United States Patent  
Liggett

(10) Patent No.: US 6,298,118 B1  
(45) Date of Patent: Oct. 2, 2001

(54) SYSTEM AND METHOD FOR PROCESSING OF COMMUNICATION LINE TEST SIGNALS, SUCH AS ENHANCEMENT PROCESSING

(75) Inventor: Arthur B. Liggett, Snohomish, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/363,165

(22) Filed: Jul. 28, 1999

(51) Int. Cl.[7] .................................................. H04M 1/24
(52) U.S. Cl. .......................... 379/21; 379/22.02; 379/24; 379/27.02; 379/27.03
(58) Field of Search .................................. 379/1, 2, 5, 6, 379/12, 19, 21, 22, 24, 26, 27, 29, 32

(56) References Cited

U.S. PATENT DOCUMENTS

| 5,193,108 | * | 3/1993 | Stocklin ................................... 379/21 |
| 5,235,629 | * | 8/1993 | Butler et al. ............................. 379/21 |
| 5,577,099 | * | 11/1996 | Clement et al. ......................... 379/21 |
| 5,619,489 | * | 4/1997 | Chang et al. ........................... 370/241 |
| 6,064,721 | * | 5/2000 | Mohammadian et al. .............. 379/21 |
| 6,144,721 | * | 11/2000 | Stephens ................................. 379/21 |

* cited by examiner

*Primary Examiner*—Binh K. Tieu
(74) *Attorney, Agent, or Firm*—Dorsey & Whitney, LLP

(57) ABSTRACT

A communication line tester system and method allows for effective measurement and presentation of communication line characteristics. The communication line tester includes a transmitter, an analog-to-digital converter and a main processor. The transmitter is electrically coupled to the communication line. The analog-to-digital converter is electrically coupled to the communication line. The main processor is electrically coupled to the analog-to-digital converter. The main processor include a pseudo-random code processor configured to generate pseudo-random coded signals for transmission by the transmitter on to the communication line and to decode pseudo-random coded signals received by the main processor from the analog-to-digital converter. The main processor also includes a multiple waveform based distortion removal processor configured to remove distortion produced by non-linear operation of tester components from signals based on a plurality of signals received from the analog-to-digital converter, the distortion removal based on a plurality of coded signals generated by the pseudo-random code processor. The main processor also includes an even-order distortion removal processor, a display presentation processor, a baseline distortion removal processor, and an open/short processor.

49 Claims, 27 Drawing Sheets

SYSTEM AND METHOD FOR PROCESSING OF COMMUNICATION LINE TEST SIGNALS, SUCH AS ENHANCEMENT PROCESSING

TECHNICAL FIELD

The present invention relates to communication line testing systems and, more particularly to a system and method for enhancement of communication line test signals.

BACKGROUND OF THE INVENTION

Testing of communication lines, such as telephone lines and network cables is a vital function for operation of communication systems. Typically. testing involves determining the operational status of a communication line. For instance, for a twisted pair telephone line, operational status would include the length of the twisted pair line, the number and location of any taps or splices on the line, and the level of attenuation that the line imposes upon a communication signal traveling across the line.

To determine operational status of a communication line, test equipment is typically placed on both ends of the line. In the case of a twisted pair telephone line, one end is generally located at a central office site, and the other end is usually located either at a residential or commercial establishment. Prior art dual-ended testing systems and methods that use testing equipment on both ends of a communication line are inherently more costly and logistically complex to implement than a single-ended testing system that requires testing equipment on only one end of a communication line. However, prior art systems have focused on dual-ended testing rather than single-ended testing because of difficulties imposed by single-ended testing.

Both dual and single-ended testing share some similar problems related to testing. Some testing problems are caused by anomalous signals being introduced by the test equipment itself on to the communication line being tested. Other measurement problems are caused by signal noise. These and other conditions adversely affect accuracy of measurements. Other related difficulties that users of the test equipment face involve poor presentation by test equipment of the test results. The poor presentation of test data is in part caused by factors that corrupt the test measurements that produced the test data. As a result, users are forced to waste time manipulating controls to obtain meaningful pictures of the test results. Often after much adjustment of controls the users have to settle for less than desirable views of somewhat suspect test data.

These problems have been obstacles to adoption of single-ended testing as a general test method for more than time domain reflectometry. Even time domain reflectometry still suffers from presentation problems. Other test measurements, such as those involving signal power measurements including signal attenuation or signal-to-noise ratios, have not found favor with single-ended testing because the problems caused by such things as anomalous signals or noise are potentially compounded for single-ended testing given the doubling of travel of a test signal compared to dual-ended testing. Test signals are harder to recover by the further attenuation involved, and anomalous signals and noise can have even greater corrupting influence on measurements.

SUMMARY OF THE INVENTION

A communication line tester system and method in accordance with the invention allows for effective measurement and presentation of communication line characteristics. The communication line tester includes a transmitter, an analog-to-digital converter and a main processor. The transmitter is electrically coupled to the communication line. The analog-to-digital converter is electrically coupled to the communication line. The main processor is electrically coupled to the analog-to-digital converter. The main processor includes a pseudo-random code processor configured to generate pseudo-random coded signals for transmission by the transmitter on to the communication line and to decode pseudo-random coded signals received by the main processor from the analog-to-digital converter.

The main processor may alternatively or additionally include a multiple waveform based distortion removal processor configured to remove distortion produced by undesired but unavoidable non-linear operation of the tester components from signals based on a plurality of signals received from the analog-to-digital converter, the distortion removal based on a plurality of coded signals generated by the pseudo-random code processor. The main processor may also include an even-order distortion removal processor, a display presentation processor, a baseline distortion removal processor, and an open/short processor.

As is conventional in the field of electrical circuit representation, sizes of electrical components are not drawn to scale, and various components are enlarged or reduced to improve drawing legibility. Component details have been abstracted in the figures to exclude detail such as position of components and precise connections used between components.

DETAILED DESCRIPTION OF THE INVENTION

In the following description, numerous specific details are provided, such as specific configuration of the apparatus, circuit components, particular communication lines tested, detailed steps of methods performed and specific tests conducted, etc., to provide a thorough understanding of the embodiments of the invention. One skilled in the relevant art, however, will recognize that the invention can be practiced without one or more of the specific details or with other processes, configurations, steps, hardware, etc. In other instances, well-known structures or operations are not shown or described in detail to avoid obscuring the description of the embodiments.

Figure 1:
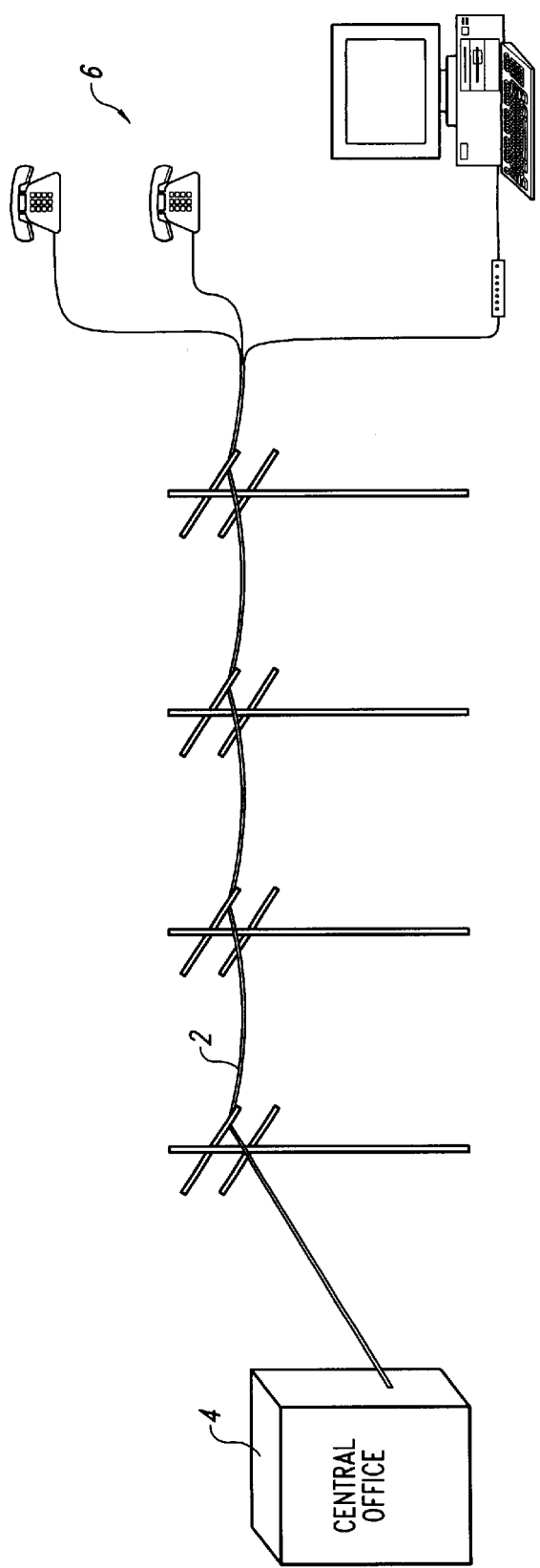
FIG. 1 is a schematic diagram illustrating a test environment in which an embodiment of the invention may be used.
Figure 2:
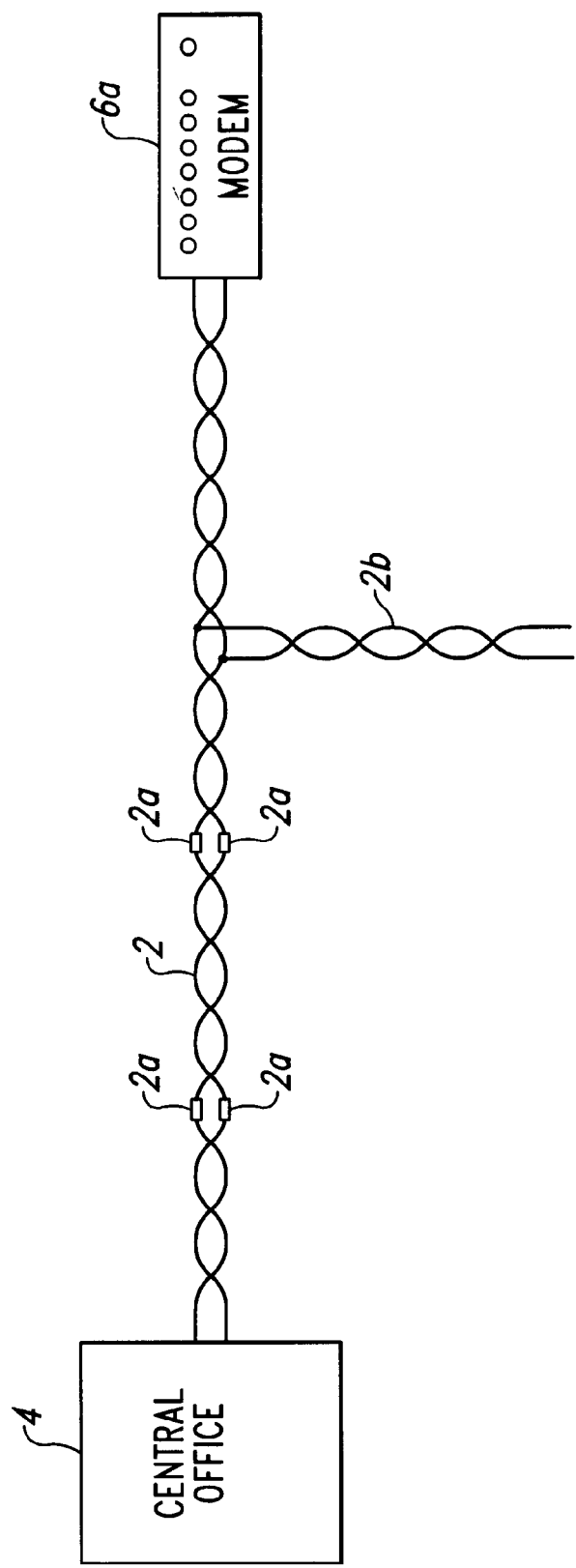
FIG. 2 is a schematic diagram further illustrating the test environment of FIG. 1 showing a twisted pair communication line.

With reference to FIGS. 1 and 2, one embodiment of the invention is configured to test a twisted pair communication line 2 originating at a central office 4 and terminating at termination end 6 either connected to end user devices such as telephones or computer modems, or unconnected. The twisted pair communication line 2 may include splices 2a and bridged taps 2b, as illustrated in FIG. 2. The twisted pair line 2 is generally used by telephone companies to provide both voice and data communication services. The length of a typical twisted pair line 2 can extend up to as long as 30,000–50,000 feet, with an average of 22 splices 2a in the twisted pair line.

Since the distance between the central office 4 and the termination end 6 can be quite significant, single-ended testing of the twisted pair line 2 is preferred over systems and methods requiring test equipment for both ends of the twisted pair line. In the past, communication services utilizing twisted pair lines have not been as demanding as newly emerging services such as asymmetric digital subscriber line (ADSL) service. Long-established services, such as voice quality phone service. typically has a 0 to 4 kilohertz frequency requirement that most twisted pair lines readily fulfilled. The newly emerging services, on the other hand, place much greater demands upon the twisted pair line 2. For instance, ADSL uses a 26 kilohertz to 1.1 megahertz bandwidth.

For testing of twisted pair lines 2 for voice quality phone service, a time domain reflectometer (TDR) test would often be sufficient in many circumstances. A TDR test is a single-ended test that helps technicians determine location of things such as splices 2a, bridged taps 2b, and the overall length of the twisted pair line from the central office 4 to the termination end 6. Dual-ended testing has been used to measure noise and attenuation characteristics of the twisted pair line, such as attenuation levels, noise levels, and signal-to-noise ratios. These dual-ended tests typically use broad band signals to obtain measurements related to a frequency spectrum of the test signals.

For the newly emerging services, noise and attenuation characteristics of the twisted pair line 2 have taken on much greater significance. Due to the greater bandwidth requirements, operational performance of the newly emerging services is highly sensitive to noise and attenuation characteristics. Yet, prior art test systems and methods remain dependent upon dual-ended testing of noise and attenuation characteristics that has greater logistical demands and potentially higher operations and equipment costs compared with single-ended testing.

To address this need for better test equipment to accommodate the newly emerging services, the depicted embodiment is utilized in signal-ended test equipment that utilizes both TDR measurement techniques and other techniques associated with obtaining attenuation, noise, signal-to-noise ratios, and other characteristics of the twisted pair line 2. The depicted embodiment also addresses a need for better presentation of measured data to the user while reducing the need for time consuming adjustments by the user. Other embodiments of the invention are used along with dual-ended test systems and methods that include transmission and reception of signals at one end of a communication line, such as improved data presentation, either in conjunction with or in addition to dual-ended tests. Further embodiments involve testing coaxial cable and fiber optic cable.

Figure 3:
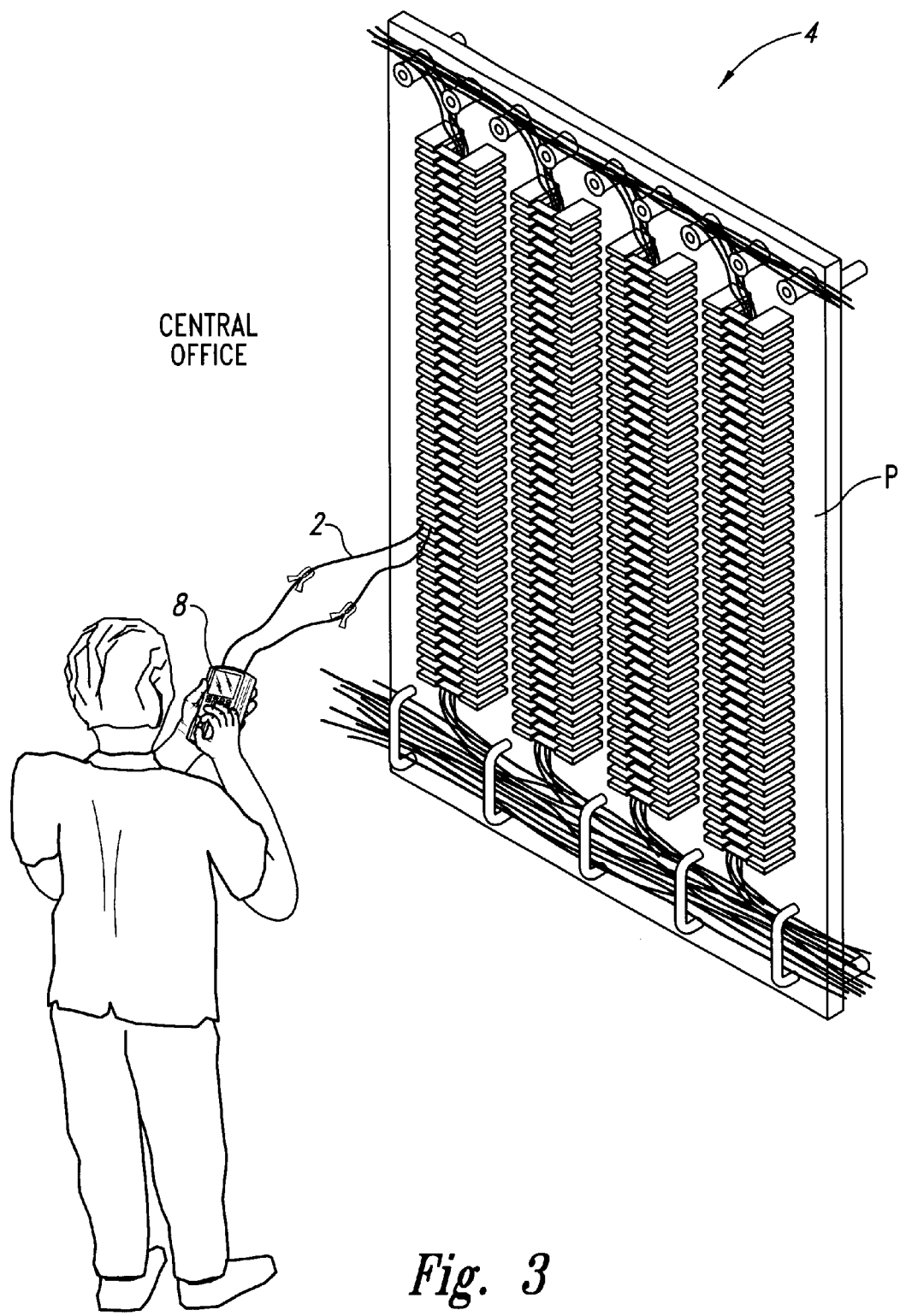
FIG. 3 is an isometric view further illustrating the test environment of FIG. 1 at a central office location.
Figure 4:
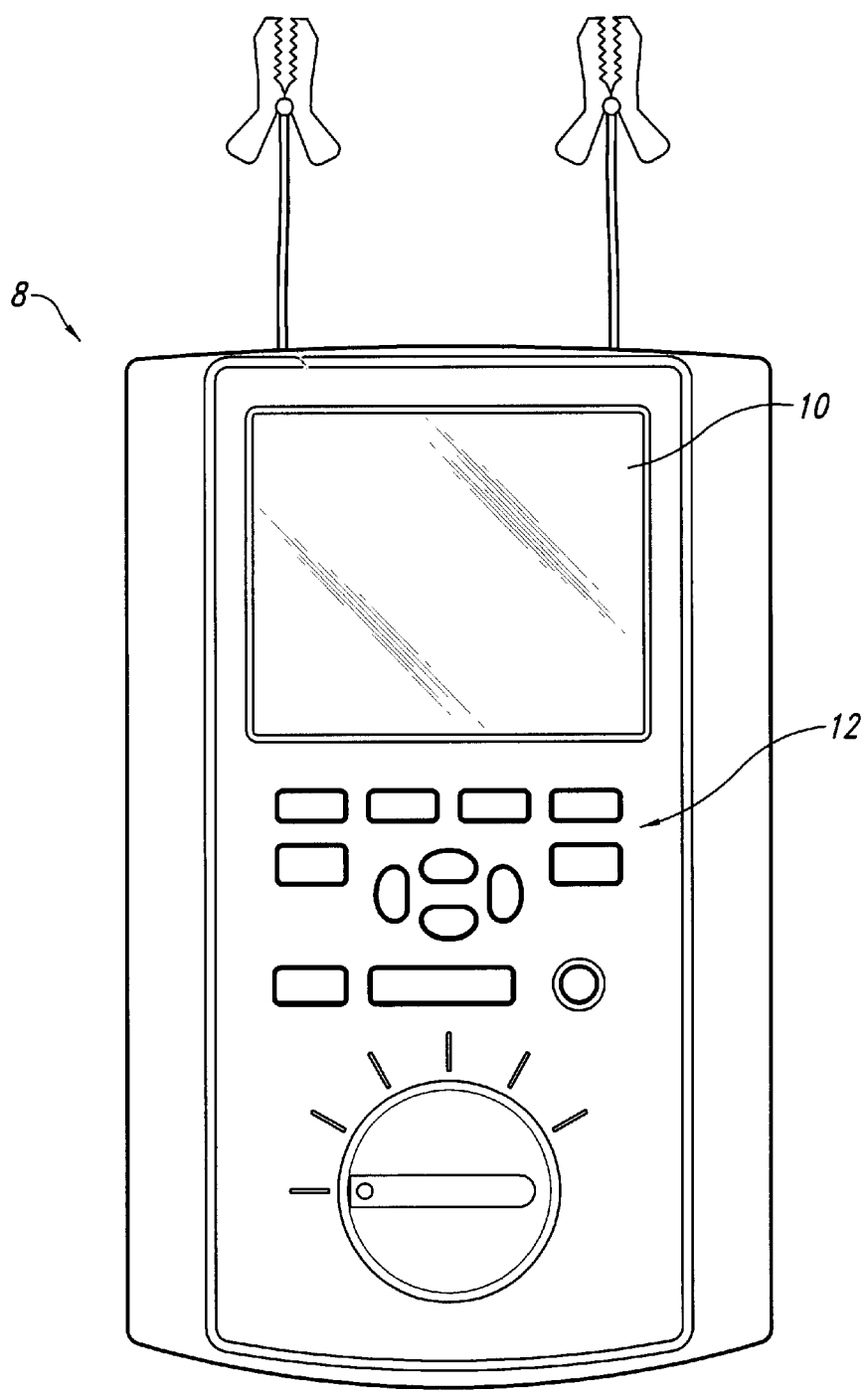
FIG. 4 is a top plan view showing an embodiment of a test apparatus in accordance with the invention.
Figure 5:
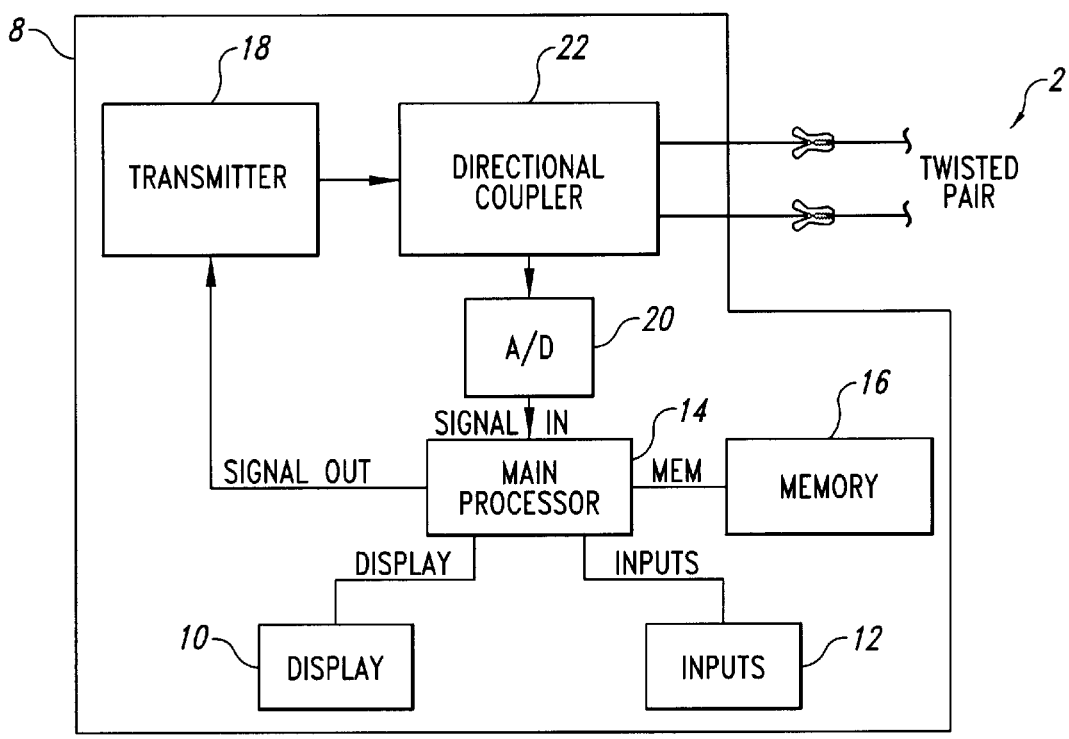
FIG. 5 is a block diagram of a test apparatus according to an embodiment of the invention.
Figure 6:
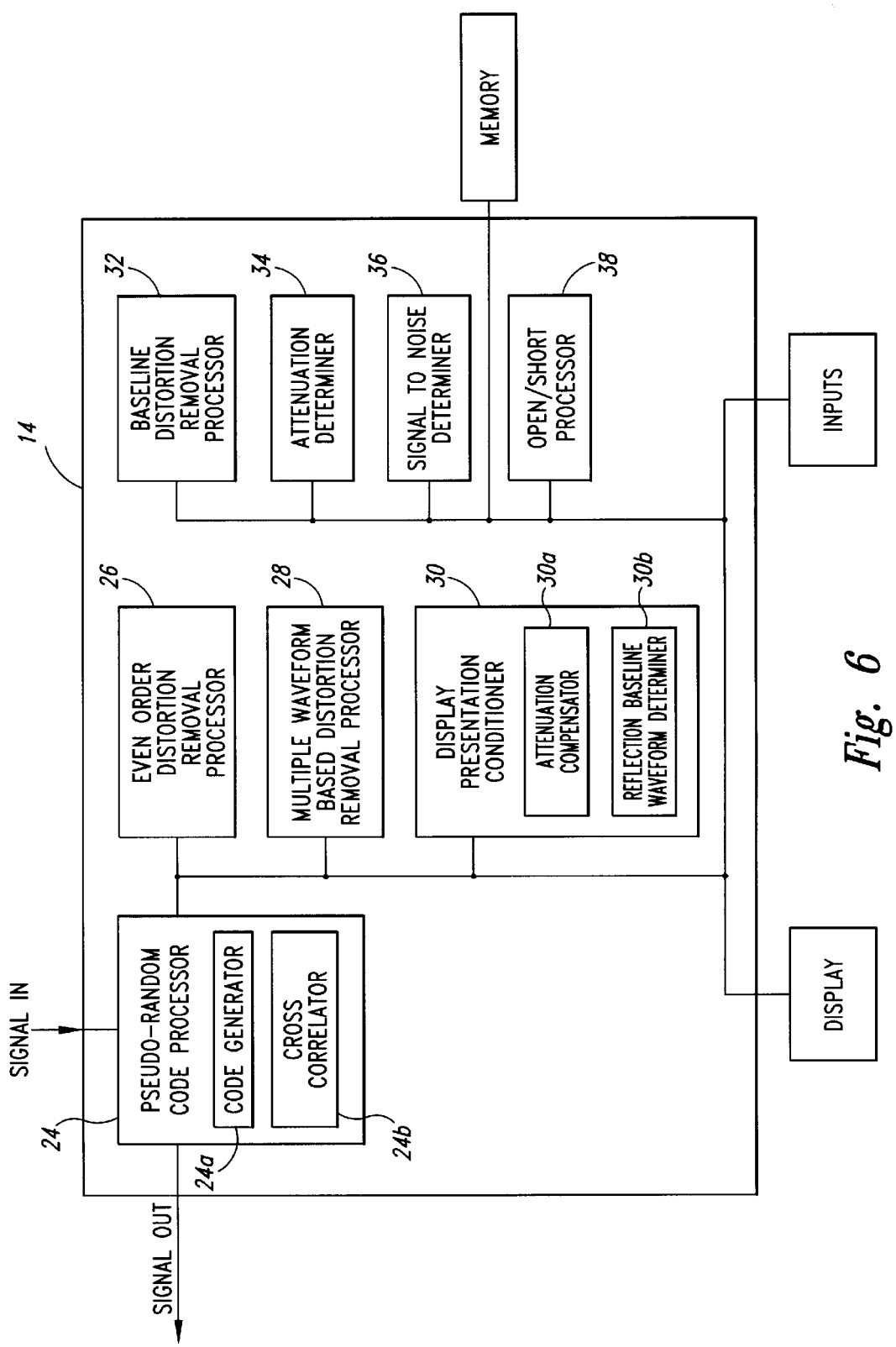
FIG. 6 is a block diagram illustrating the test apparatus embodiment of FIG. 5.

One embodiment of the invention is shown in FIGS. 3 and 4 and is represented by block diagram in FIGS. 5 and 6. The line tester 8 is shown in FIG. 3 in use at a central office 4 coupled to a twisted pair line 2 through a terminal panel P. With reference to FIG. 4, the line tester 8 includes a display 10 and various operating keys 12.

The components of the line tester 8, including a main processor 14, are illustrated in FIG. 5. The main processor 14 executes a program stored in a memory 16 to initiate test signals sent by a transmitter 18 and processes reflected test signals received from an analog-to-digital ("A/D") converter 20 The memory 16 is also used to store data. such as data indicative of reflected test signals. The transmitter 18 transmits test signals through a directional coupler 22 to the twisted pair line 2. The directional coupler 22 also couples reflected test signals from the twisted pair line 2 to the A/D converter 20. However, the directional coupler 22 isolates signals transmitted by the transmitter 18 from the A/D converter 20 to reduce the amplitude of transmitted signals being received by A/ID converter.

The main processor 14 is shown in greater detail in FIG. 6 in an abstracted block diagram form. The main processor 14 includes a pseudo-random code processor 24, an even order distortion removal processor 26, a multiple waveform based distortion removal processor 28, a display presentation conditioner 30, a baseline distortion removal processor 32, an attenuation determiner 34, a signal-to-noise determiner 36, and an open/short processor 38. Although these components are illustrated in FIG. 6 with a particular configuration and interconnections, other embodiments for the main processor include different configurations and interconnections, including combinations of some of the components resulting in fewer processors or further division of other components resulting in additional components. The components of FIG. 6 are realized in some embodiments in hardware, whereas in other embodiments they are implemented in software.

The pseudo-random code processor 24 is used by the main processor 14 to generate and decode pseudo-random coded signals to be transmitted on and received from the twisted pair line 2. By using conventional pulse compression radar technology, the code processor 24 causes the line tester 8 to send a continuous series of consecutive pulses down the communication line 2 without waiting for a reflected signal. In this way, the line tester 8 is able to apply more test signal energy into the twisted pair line 2 than if a single test pulse was used. As a result, the reflected signals received by the A/D converter 20 have a relatively high signal-to-noise ratio, thereby increasing the accuracy of signal measurements. Also, the series of test pulses have less energy per pulse than if a single test pulse is used so there is a lower possibility of cross-talk occurring across the various twisted pair lines 2.

The pseudo-random code processor 24 includes a code generator 24a and a cross correlator 24b. In the depicted embodiment, the code generator 24a generates a series of coded pulses according to maximal length sequences (MLS) using techniques that are also known in pulse compression radar technology. As the series of coded pulses are reflected back to the line tester 8, they are received and sent to the code processor 24. The cross correlator 24b then generates a pulse whenever a certain sequence of pulses arrives at the line tester 8. In this way the cross correlator 24b acts as a matched filter to screen spurious signals from being processed in the main processor 14.

In the depicted embodiment, the code generator 24a uses a 9 stage shift register known in the art of pseudo-random code generation. The outputs of selected stages of the shift register (feedback taps) are summed, modulo 2, to form the input of the $1^{st}$ stage of the shift register. These feedback taps are used to define the MLS code. The shift register and feedback logic in the depicted embodiment are implemented in software and, as described below, there are four different codes used for generating the MLS pulses. The feedback taps used for generating these pulses are tap 5 and tap 9 for the first code, taps 5, 6, 8, and 9 for the second code, taps 5, 6, 8, and 9 for the third code, and taps 2, 7, 8, and 9 for the fourth code. The first, third, and fourth codes are generated by sending all the bits in a time-reversed order. Other codes are used in other embodiments.

Although the code processor overall is most helpful in increasing accuracy of measurements, it also has drawbacks which are dealt with by other components of the main processor 14. In particular, undesired non-linear operation of the transmitter 18, directional coupler 22, and A/D converter 20 introduces anomalous signals that are artifacts of using the coded pulses. These artifacts are mostly remedied by the even order distortion removal processor 26, and the multiple waveform based distortion removal processor 28. The even order processor 26 uses the method illustrated by the flowchart of FIG. 7.

Figure 7:
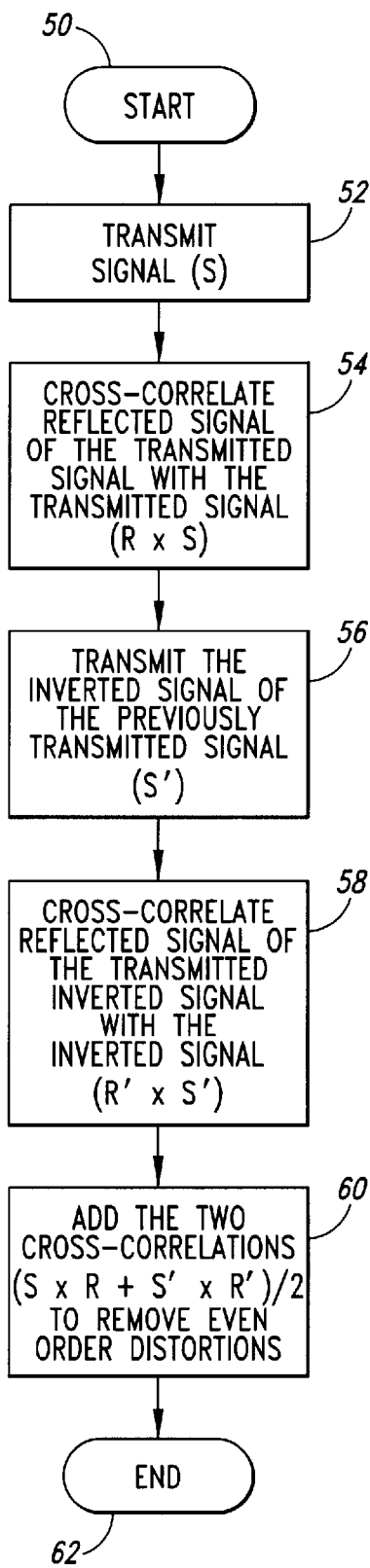
FIG. 7 is a flowchart illustrating a method used by an even order distortion removal processor of the test apparatus embodiment of FIG. 6.

With reference to FIG. 7, the even order method first starts at step 50. An original MLS coded signal is transmitted by the line tester 8 in step 52. The subsequent reflected signal is cross correlated with the original MLS coded signal in step 54. The even order processor 26 then causes the line tester 8 to transmit a copy of the original MLS coded signal that has been inverted in sign but not magnitude in step 56, and the subsequent reflected signal of the inverted original signal is cross correlated with the inverted signal in step 58. The two cross correlations are then added together and the summation is divided by two in step 60, resulting at step 62 in an even order distortion reduced (EODR) waveform. The EODR waveform is the received reflected signal, based on the original MLS coded signal, that no longer has to a substantial degree any even order contributions from anomalous signals caused by imperfect operation of the tester components.

In an alternative embodiment, the even order processor 26 produces an EODR waveform by first subtracting a reflected signal of an inverted original signal from a reflected signal of an original signal. The even order processor 26 then divides the result from the subtraction by two. This divided result is subsequently crosscorrelated with the original signal to obtain an EODR waveform.

Figure 8:
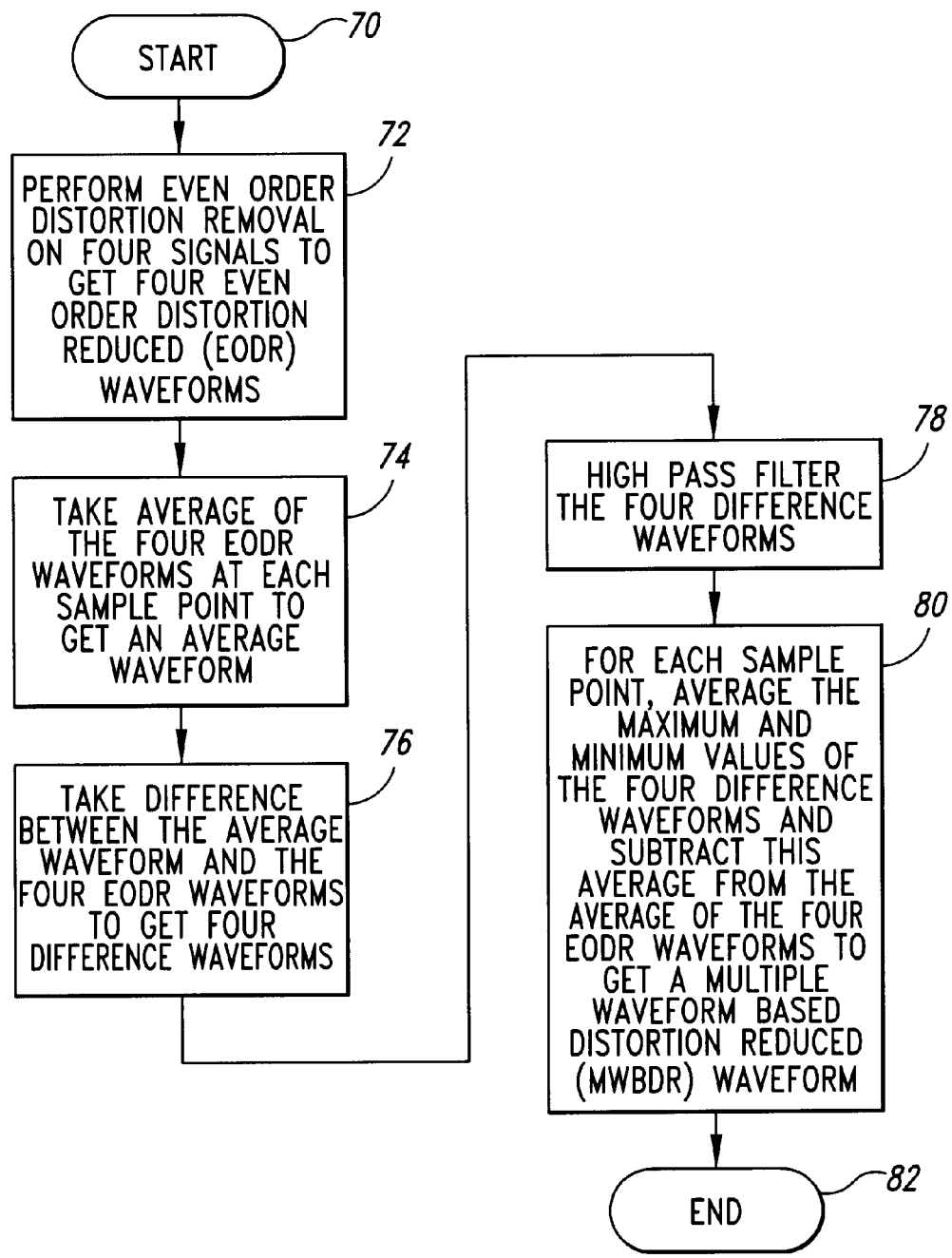
FIG. 8 is a flowchart illustrating a method used by a multiple waveform based distortion removal processor of the test apparatus embodiment of FIG. 6.

The multiple waveform distortion processor 28 (FIG. 6) uses the method illustrated by the flowchart of FIG. 8. The multiple waveform processor 28 starts at step 70, and generates four EODR waveforms based on four original MLS coded signals at step 72. In the depicted embodiment, the four original MLS coded signals are generated by the code generator 24a using the four codes described above. In other embodiments, the multiple waveform processor 28 can use other numbers of EODR waveforms not smaller than three. The multiple waveform processor 28 then takes the average of the four EODR waveforms at each sample point of the waveforms to get an average waveform in step 74, and then takes the difference between the average waveform and the four EODR waveforms to get four difference waveforms in step 76. The four difference waveforms are high pass filtered in step 78. Subsequently, in step 80, for each point of the difference waveforms, the average of the maximum and minimum value across the four difference waveforms is determined and subtracted from the corresponding point of the average waveform obtained in step 74, to obtain the multiple waveform based distortion reduced (MWBDR) waveform. The multiple waveform processor ends the procedure at step 82. The MWBDR waveform can then be subsequently used by the display presentation conditioner 30 or the baseline distortion removal processor 32. Other embodiments of the line tester 8 do not use the code processor 24 to generate and decode test pulses. Consequently, for these embodiments the even order processor 26 and the multiple waveform processor 28 are not used. Instead, another reflection waveform, other than the MWBDR waveform, is processed by the presentation conditioner 30, the baseline distortion removal processor 32, and the open/short processor 38.

The presentation conditioner 30, the baseline processor 32, and the open/short processor 38 processes either the MWBDR waveform, if the line tester 8 uses the code generator 24a, or another reflected waveform if the code generator is not used. For sake of explanation, the waveform processed by the presentation conditioner 30, the baseline processor 32, and the open/short processor 38 will be referred to generally as the reflection waveform.

The following descriptions of the presentation conditioner 30 and the baseline processor 32 include flowcharts of methods performed by these components and associated graphs illustrating results of the methods. In general, the graphs of FIGS. 12–13, 15–18, 20–22, and 24–26 were generated with a signal processor sampling at 8.832 million samples per second which corresponds to approximately 11.3225 microseconds per 100 sample points. The graphs are used to show the effects of steps implemented in the methods and the final results of the methods upon a signal received by the signal tester 8. Time zero for the graphs is sample point 25, except for FIGS. 20–21 and where an additional 1000 sample points were added to the beginning of the graph to aid in manipulation of the waveform, and where FIG. 24 has 2044 additional points. Time zero is the sample point of the waveform where the start of a reflection of a signal transmitted by the signal tester 8 would appear if it were reflected from an end of a zero length twisted pair line 2. The vertical axis of the graphs is related to either the magnitude of the reflection signal received by the signal tester 8 or the magnitude of a waveform derived from the reflection signal by one of the components of the main processor 14.

Figure 9:
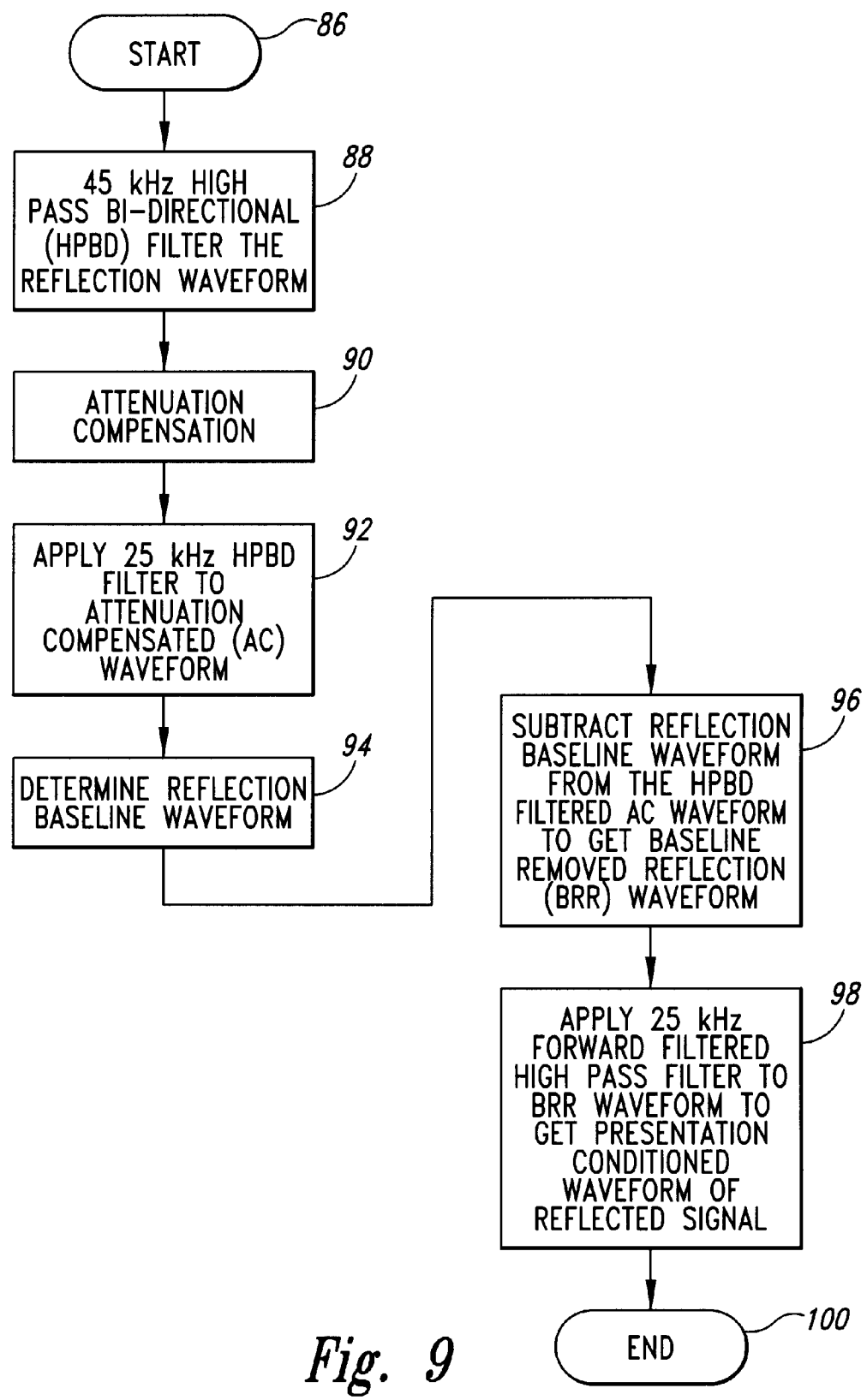
FIGS. 9–11 are flowcharts of methods used by a display presentation conditioner of the test apparatus embodiment of FIG. 6.

The presentation conditioner 30 uses the method illustrated in FIG. 9 to condition the reflection waveform for presentation. The method starts at step 86, and the reflection waveform is high-pass bi-directionally filtered at 45 KHz at step 88. Bi-directional filtering means that filtering is performed on an original signal in order of the actual time sequence of the original signal (forward filtering). Filtering is then performed on the forward filtered sequence in reverse order of the actual time sequence of the original signal. This eliminates phase distortion in the filtered signal. The bi-directional filtering is implemented by the depicted embodiment in software, but in other embodiments the bi-directional filtering is implemented in hardware.

Figure 12:
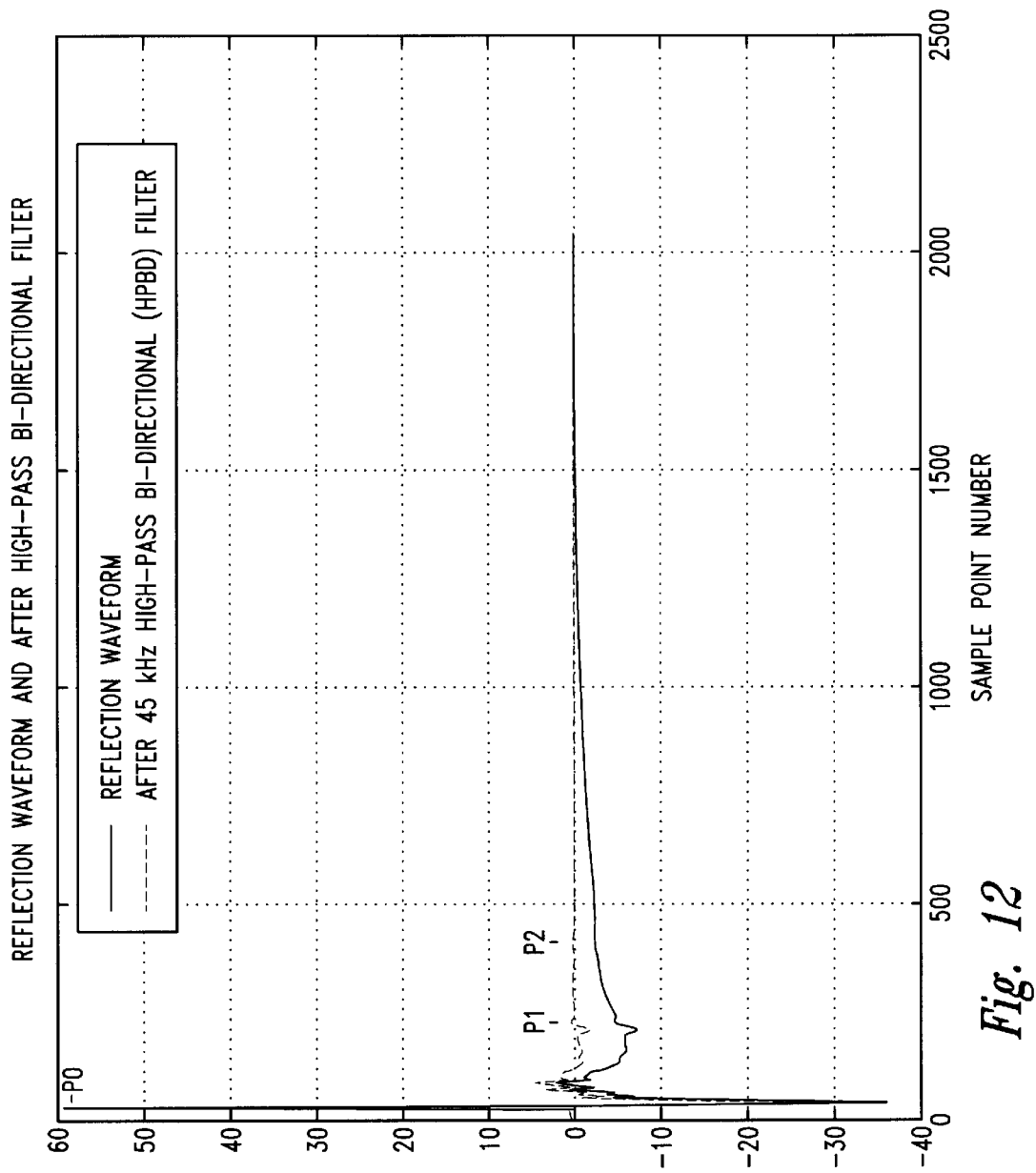
FIGS. 12 and 13 are graphs of signal waveforms illustrating affects of steps performed according to the methods illustrated by the flowcharts of FIGS. 9 and 10.

The graph of FIG. 12 illustrates the effects of high-pass bi-directional filtering at 45 KHz, found in step 88, upon the original reflection waveform received by the signal tester 8. The graph of FIG. 12 displays signal magnitude along the vertical axis and sample points along the horizontal axis. Both the original reflection waveform received by the signal tester and the resultant waveform after high-pass bi-directional filtering are shown. The resultant waveform is more centered along the vertical axis of the graph compared to the original reflection waveform as a result of the high-pass bi-directional filtering.

The two waveforms shown in FIG. 12 each have two peaks of interest, P1 and P2. (A third peak near the beginning of the waveform, P0, is the result of the inadvertent (but normally unavoidable) leakage of a small portion of the transmitted test signal directly into the reflection signal received by the A/D.) The first reflection peak, P1, is the reflection of the test signal from a bridged tap in the middle of a test communication line. The barely discernible second reflection peak, P2, is the reflection of the test signal off the end of the test communication line. P1 is much larger than P2 due to the attenuation of the test communication line. If there were no attenuations in the test communication line, P2 would be about the size of P1 (base to peak), and ideally should be displayed this way. The following steps will help remedy the effects of the cable attenuation.

Figure 13:
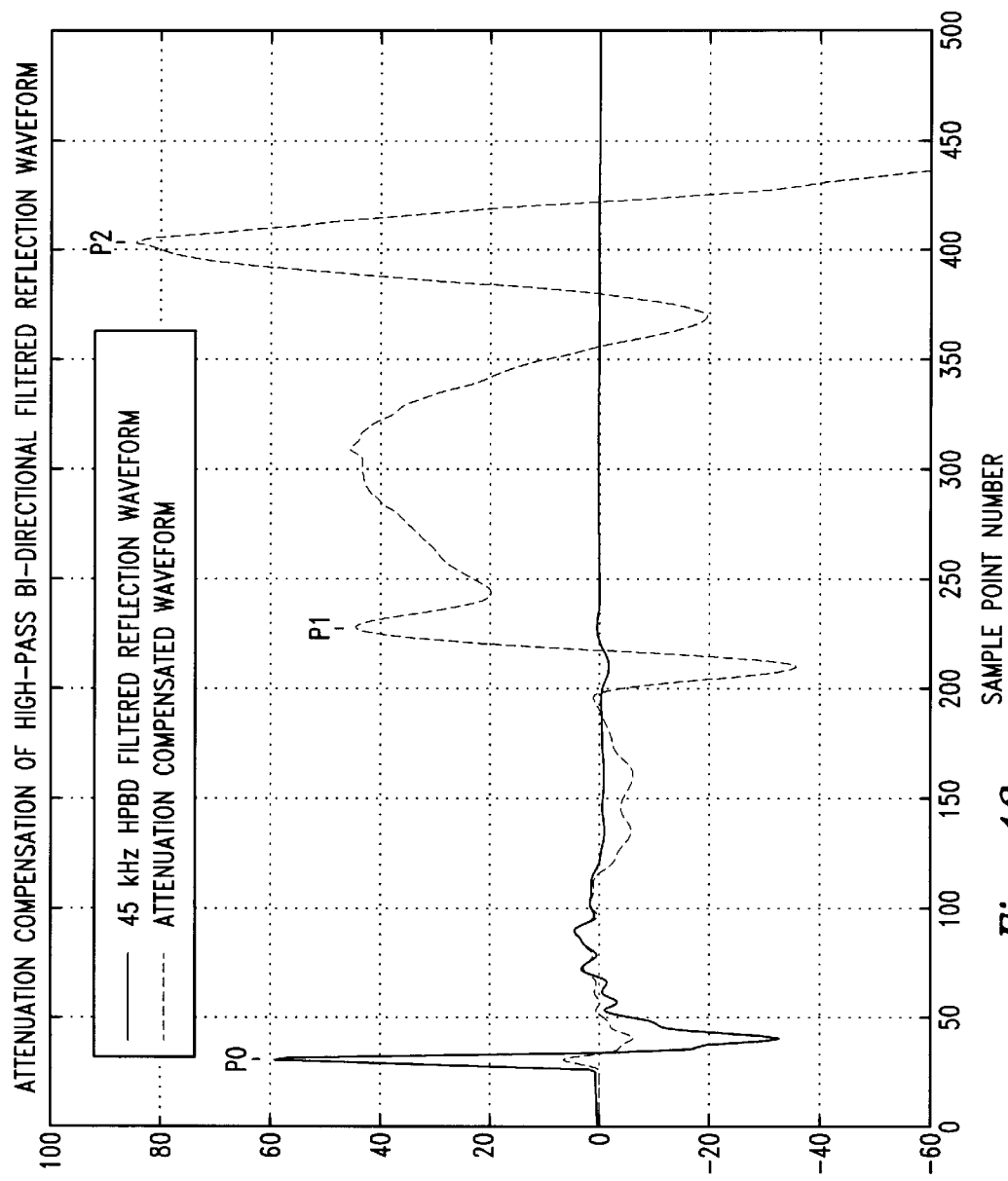

The presentation conditioner 30 uses an attenuation compensator 30a (FIG. 6) to perform attenuation compensation on the high-pass filtered waveform in step 90 to obtain an attenuation compensated waveform. The process of attenuation compensation is described in more detail below. The graph of FIG. 13 illustrates the results of the attenuation compensation step 90 by showing both the high-pass filtered waveform before attenuation compensation and the attenuation compensated waveform. The vertical axis of the graph of FIG. 13 indicates signal magnitude and the horizontal axis of the graph of FIG. 13 indicates corresponding sample points of the displayed waveforms. As shown by the graph of FIG. 13, after attenuation compensation, the second peak, P2, of waveform related to reflection of the transmitted test signal from the end of the test communication line is now discernable and approximately the size of the first peak, P1, due to reflection of the test signal off of the end of the bridged tap in the middle of the test communication line.

Figure 15:
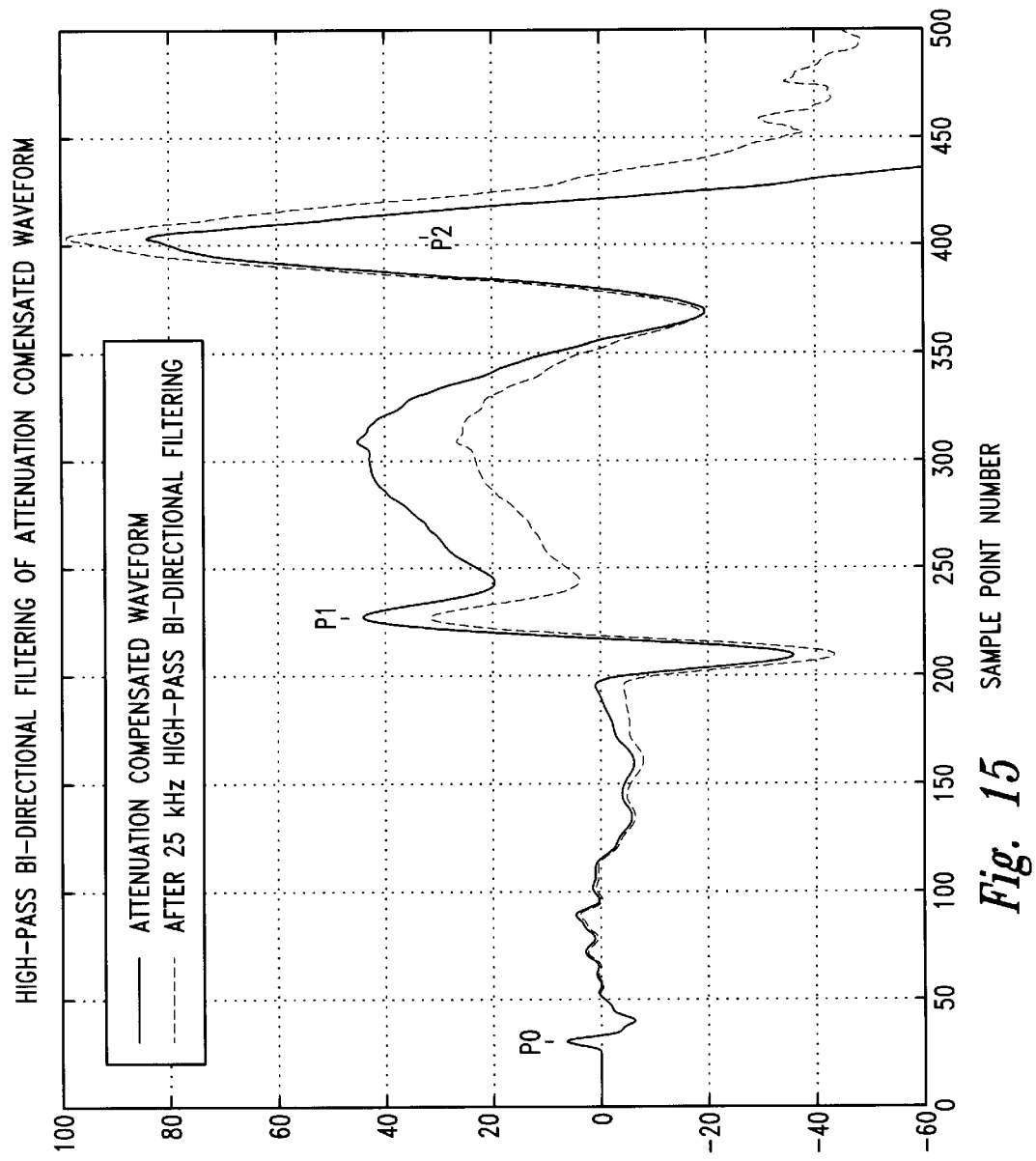
FIGS. 15–18 are graphs of signal waveforms illustrating affects of steps performed according to the methods illustrated by the flowcharts of FIGS. 9 and 11.

After attenuation compensation, the display presentation conditioner 30 applies a 25 KHz high-pass bi-directional filter to the attenuation compensated waveform in step 92. Here, the purpose of high-pass filtering is reduction of low-frequency distortion introduced by the attenuation compensation step 90. The graph of FIG. 15 illustrates the results of high-pass filtering the attenuation compensated waveform in step 92 by showing both the attenuation compensated waveform and the waveform after high-pass filtering of the attenuation compensated waveform. The vertical axis of the graph of FIG. 15 indicates signal magnitude and the horizontal axis of the graph of FIG. 15 indicates corresponding sample points of the displayed waveforms.

Figure 16:
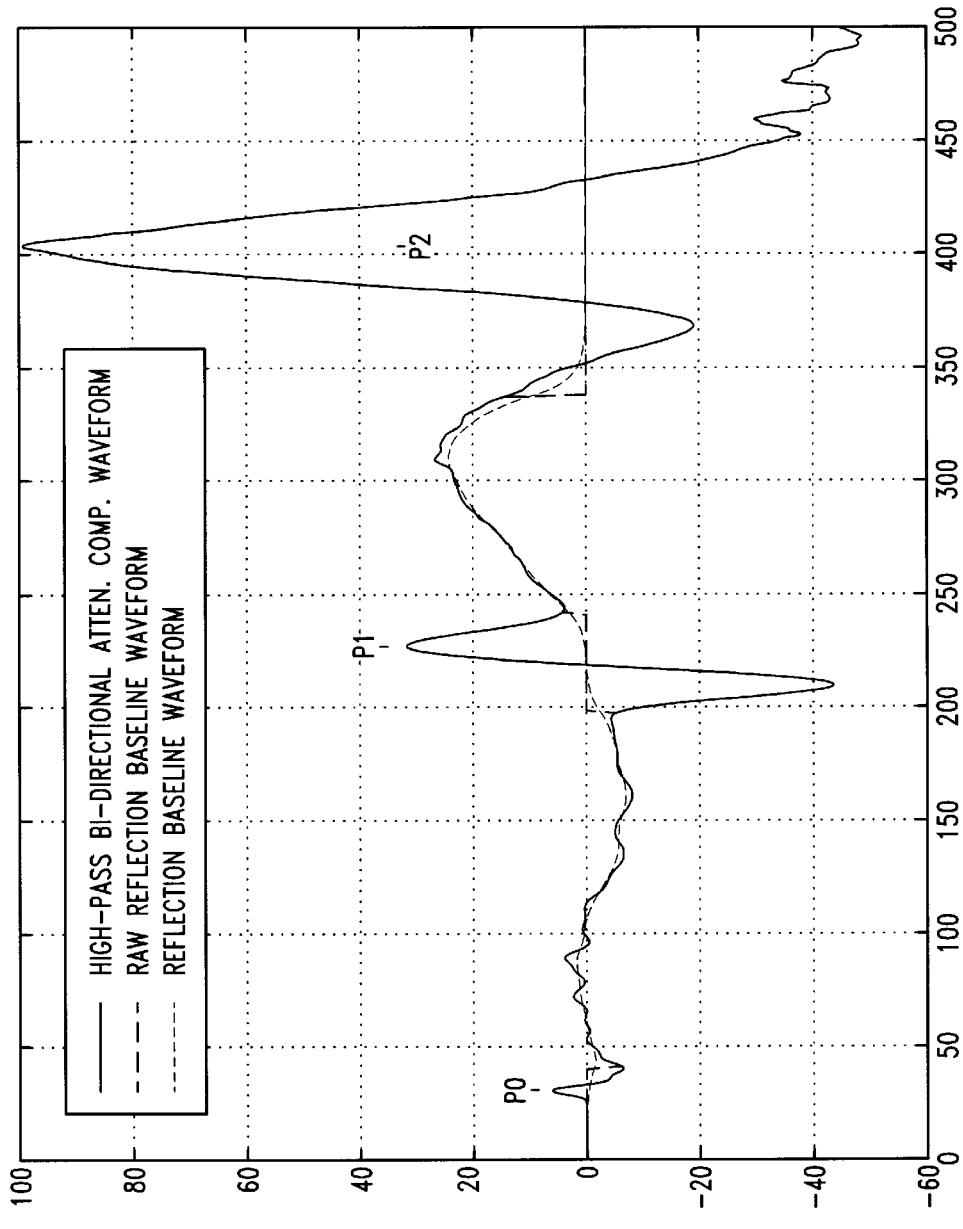

In step 94, the presentation conditioner 30 uses a reflection baseline waveform determiner 30b (FIG. 6) to determine a reflection baseline waveform by a process described in detail below. The graph of FIG. 16 illustrates the results of determining the reflection baseline waveform of step 94 by showing the attenuation compensated waveform; a raw reflection baseline waveform that is an intermediate waveform of baseline determination; and a reflection baseline waveform that is the result of the baseline determination process. The vertical axis of the graph of FIG. 16 indicates signal magnitude and the horizontal axis of the graph of FIG. 16 indicates corresponding sample points of the displayed waveforms. The actual forms of the raw reflection baseline waveform and the resultant reflection baseline waveform show how the baseline of the original reflection signal received by the signal tester 8 has been distorted. This reflection baseline waveform will be removed as discussed further below.

Figure 17:
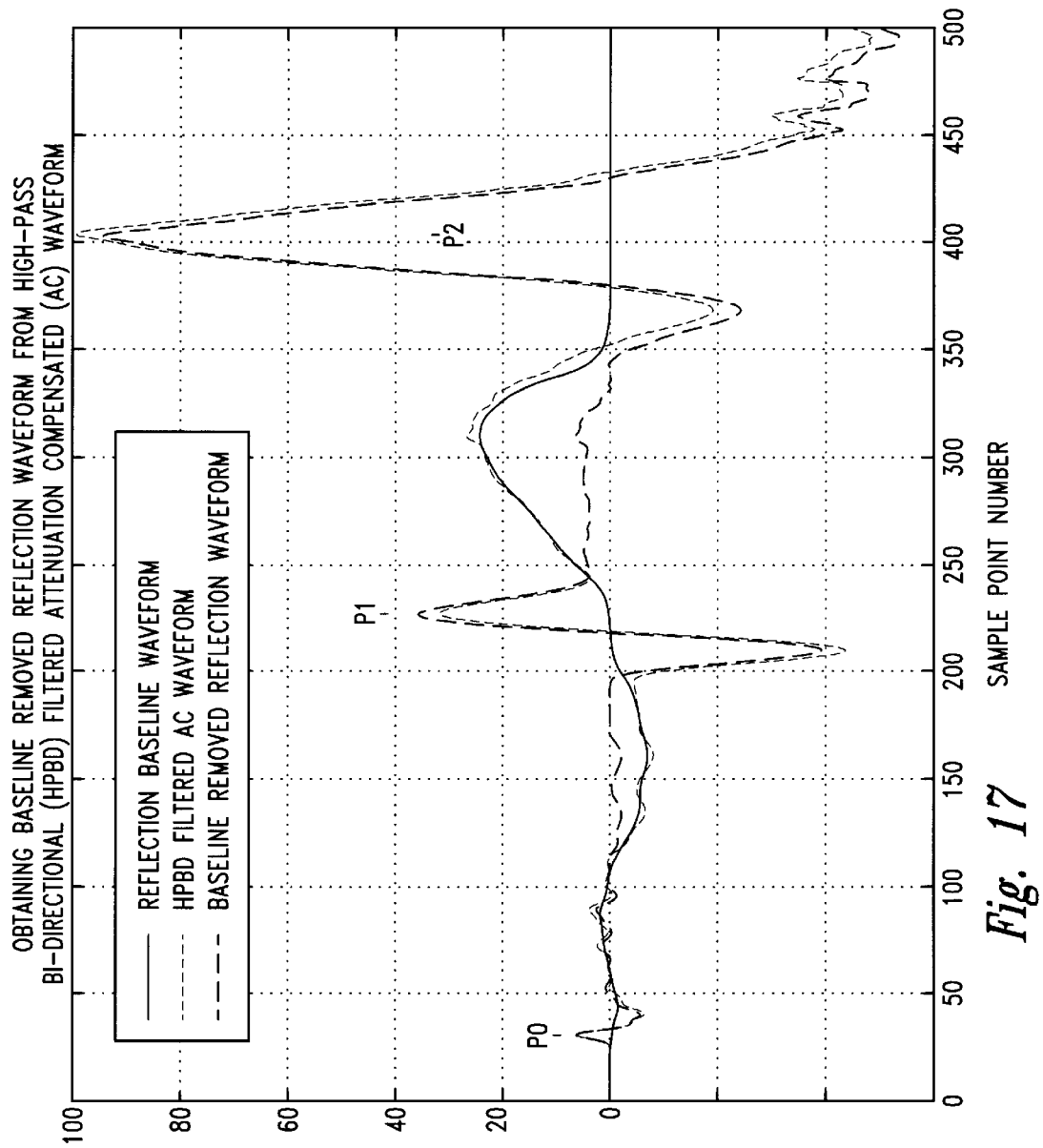

The presentation conditioner 30 then subtracts the reflection baseline waveform from the high-pass bi-directionally filtered attenuation compensated waveform to get a baseline removed reflection waveform in step 96. The graph of FIG. 17 illustrates the results of the subtraction of the reflection baseline waveform in step 96 by showing the reflection baseline waveform, the high-pass filtered attenuation compensated waveform before removal of the reflection baseline waveform, and the baseline removed reflection waveform after removal of the reflection baseline waveform from the high-pass filtered attenuation compensated waveform. The vertical axis of the graph of FIG. 17 indicates signal magnitude and the horizontal axis of the graph of FIG. 17 indicates corresponding sample points of the displayed waveforms. As shown by the graph of FIG. 17, after removal of the reflection baseline waveform, the baseline removed reflection waveform has only two prominent peaks being the first peak, P1, and the second peak, P2, previously discussed. The resultant display is much easier for a user to understand since there are no large peaks that would not be of interest to the user. Before removal of the reflection baseline waveform there were additional peaks on the waveform as shown by the high-pass filtered attenuation compensated waveform. These additional peaks were not of interested since they did not convey substantive information about the twisted pair line 2 being tested.

Figure 18:
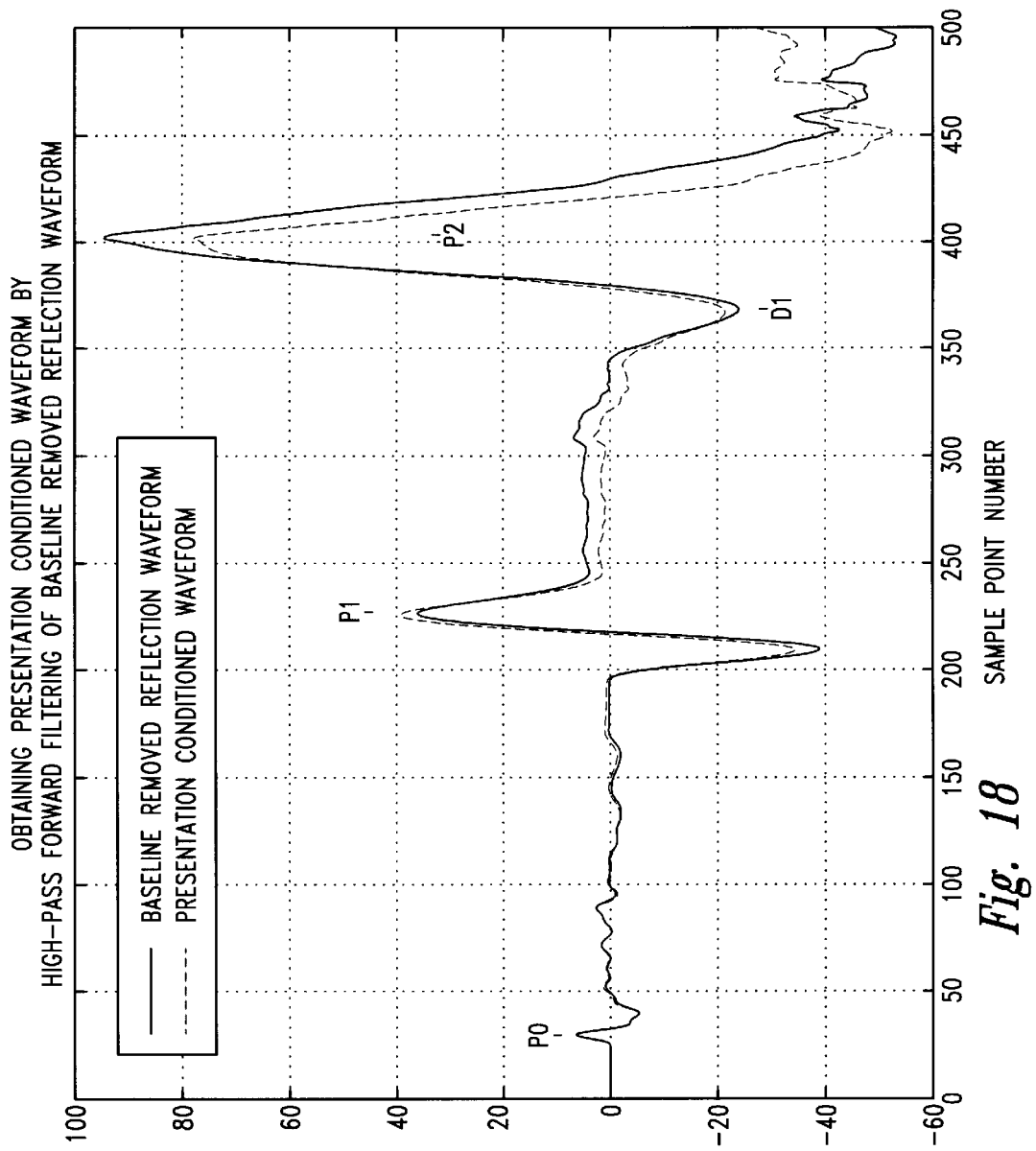

Application of a 25 KHz forward high-pass filter to the baseline removed reflection waveform in step 98 results in a presentation conditioned waveform of the reflection waveform. The graph of FIG. 18 illustrates the results of high-pass filtering of the baseline removed reflection waveform of step 98 by showing both the baseline removed reflection waveform before high-pass filtering and the presentation condition waveform after high-pass filtering. The vertical axis of the graph of FIG. 18 indicates signal magnitude and the horizontal axis of the graph of FIG. 18 indicates corresponding sample points of the displayed waveforms. As shown by the graph of FIG. 18 the general beneficial result of the high-pass filtering for step 98 is to move the presentation conditioned waveform closer to the horizontal axis for sample points of the presentation conditioned waveform unrelated to a prominent feature of the twisted pair line 2 being tested. Thus, the end result of this final high-pass filtering of step 98 is to further clarify the waveform to better convey information regarding the tested twisted pair line 2 to the user. Comparison of the initial reflection waveform shown in FIG. 12 with the presentation conditioned waveform in FIG. 18 illustrates the ability of the presentation conditioned waveform to have a greater impact in conveying information regarding the characteristics of a test communication line compared with the initial reflection waveform.

Figure 10:
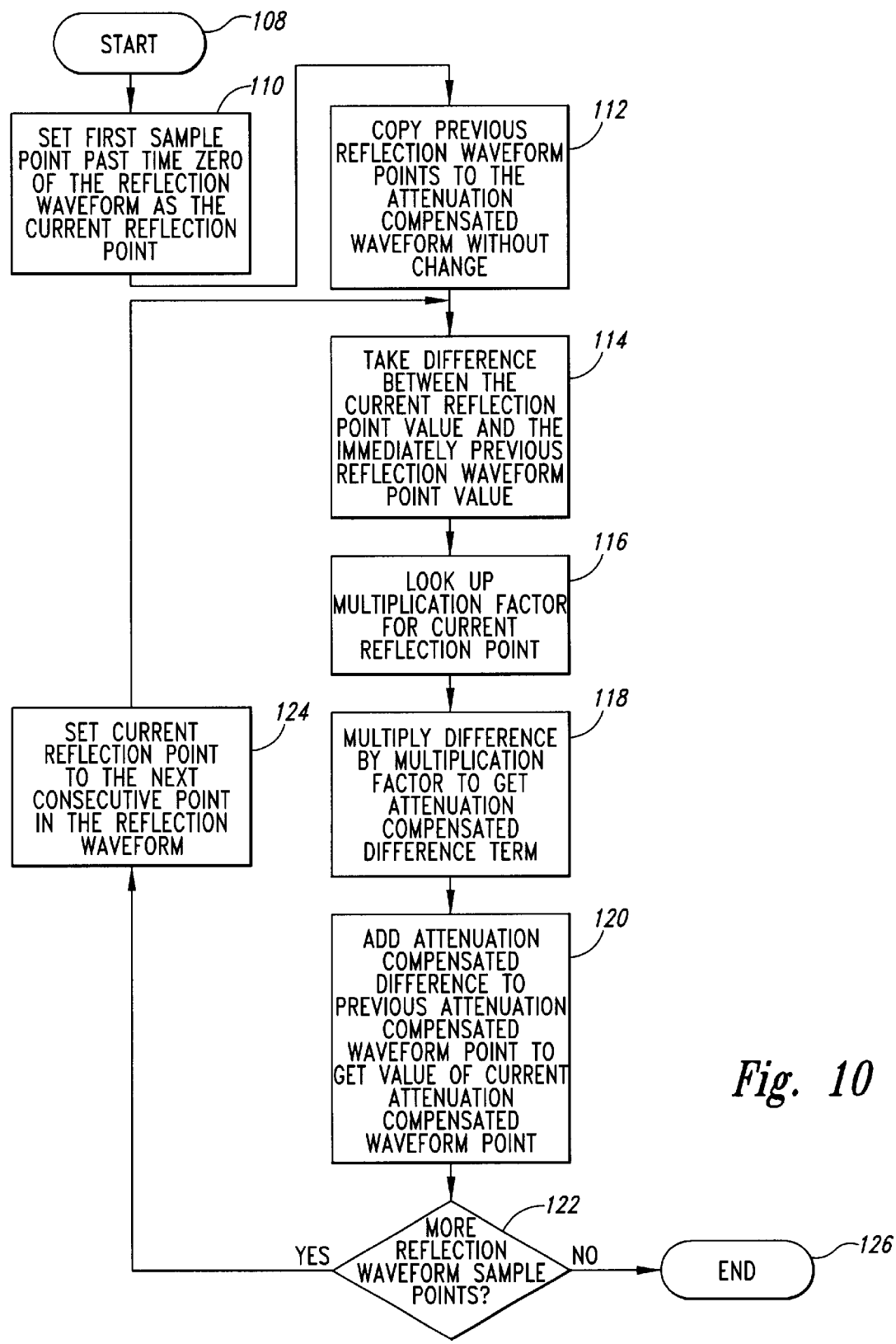

To implement the attenuation compensation of step 90, the attenuation compensator 30a of the presentation conditioner 30 performs a method illustrated in FIG. 10. The method is entered at step 108. All points of the reflection waveform, up to and including the time zero point, are copied without change to the attenuation compensated waveform in step 110. In step 112, the first sample point past the time zero point of the reflection waveform is selected to become the current reflection point. In step 114, the presentation conditioner takes the value difference between the current reflection point and the immediately previous point in the reflection waveform. The presentation conditioner 30 then looks up the multiplication factor to be applied to this difference using an attenuation compensation multiplication factor curve as shown in FIG. 14.

Figure 14:
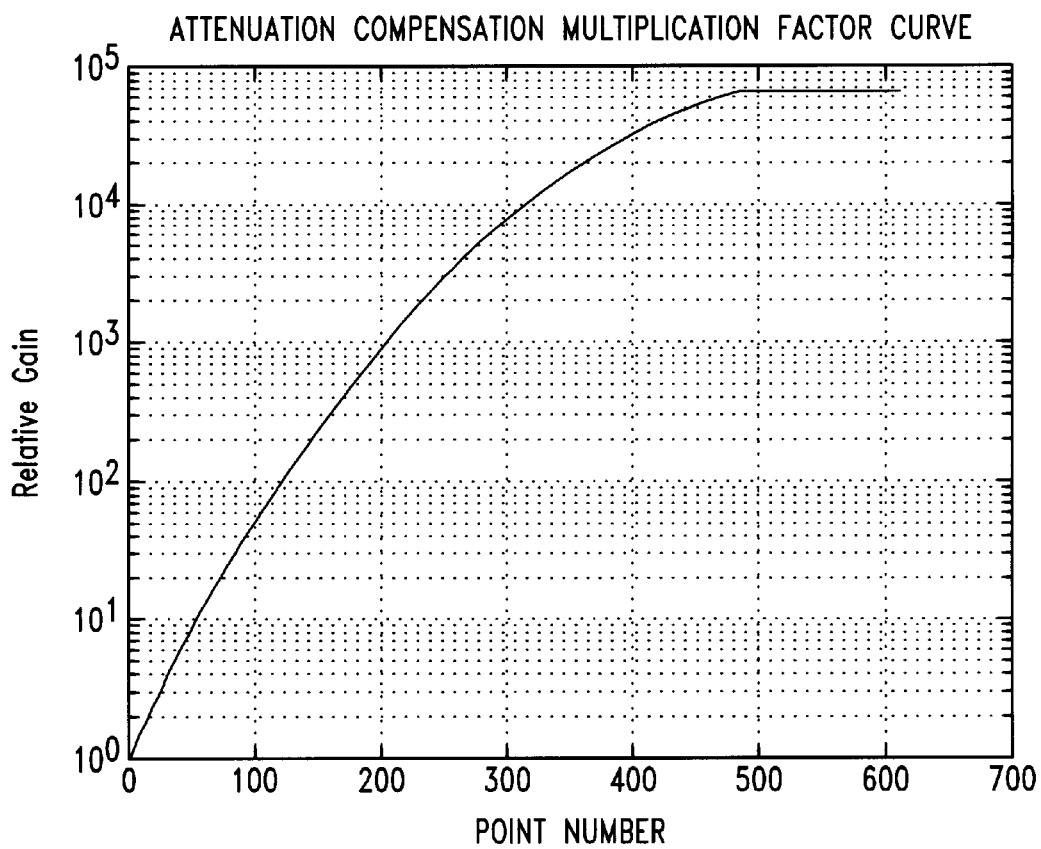
FIG. 14 is graph of an attenuation compensation multiplication factor curve used by a step performed according to the method illustrated by the flowchart of FIG. 10.

The multiplication factor curve of FIG. 14 has relative gain multiplication factors on its vertical axis versus sample point number (relative to the time zero point) on its horizontal axis. Thus, for the first point past time zero, the multiplication factor would be 1 (ten to the zero power=1) as shown on the multiplication factor curve of FIG. 14. The multiplication factor curve of FIG. 14 is typical, and may be modified to match the attenuation and length characteristics of twisted pair line 2.

The presentation conditioner 30 then multiplies the difference determined in step 114 by the multiplication factor obtained in step 116 to get an attenuation compensated difference term in step 118. This attenuation compensated difference term is then added in step 120 to the immediately previous point in the attenuation compensated waveform to obtain the value of the point in the attenuation compensated waveform corresponding to the current reflection point. The presentation conditioner 30 then determines in step 122 if there is another reflection waveform sample to be attenuation compensated and if so, branches under a "yes" condition to step 124, where the sequentially next reflection waveform sample becomes the current reflection point, and then returns to step 114. If all reflection waveform sample points to be attenuation compensated have been used, the method branches under a "no" condition to step 126 where the method for attenuation compensation ends.

Figure 11:
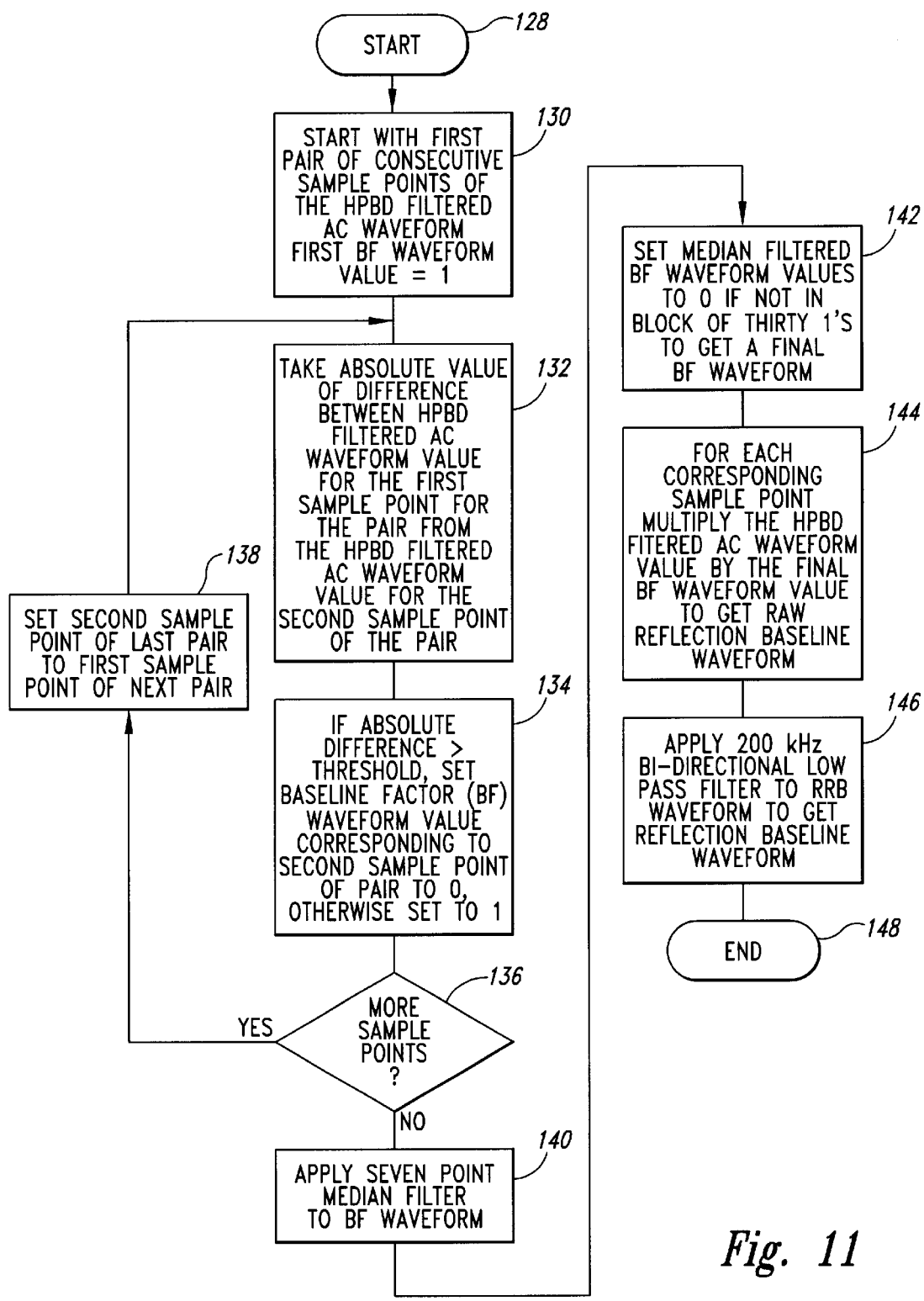

To determine the reflection baseline waveform of step 94 of FIG. 9 the reflection baseline waveform determiner 30b generates according to a method shown in FIG. 11. The method is entered at step 128, and the first pair of consecutive sample points of the high-pass bi-directional filtered attenuation compensated waveform are selected at step 130. Additionally, the first point in a baseline factor waveform is set to 1 at step 130. The presentation conditioner 30 then calculates at step 132 the absolute value of the difference between the high-pass bi-directional filtered waveform value for the first sample point of the pair and the high-pass bi-directional filtered waveform value for the second sample point of the pair to get a baseline difference for the pair of sample points. If the baseline difference for the pair of sample points is greater than a threshold value, the presentation conditioner 30 sets a baseline factor waveform value corresponding to the second sample point of the pair to 0 in step 134. If the baseline difference is less than the threshold value, the baseline factor waveform value is set to 1 in step 134.

The presentation conditioner 30 then goes to step 136 and branches under a "yes" condition back to step 138 if there are more sample points that have not yet been used for assignments of 0 or 1 values. In step 138, the presentation conditioner 30 creates the next sample point pair, consisting of the second sample point of the last pair, and the next consecutive point of the high-pass bi-directional filtered attenuation compensated waveform. After step 138, step 132 is re-entered. The method branches under a "no" condition to step 140 if there are no further points, which indicates that the baseline factor waveform has been fully generated. In step 140, the presentation conditioner 30 applies a seven point median filter to the baseline factor waveform. This filtering is performed by applying the median value of the baseline factor waveform for each seven consecutive sample points to the baseline factor waveform for the middle sample point of the seven. Other sizes of median filters are used in other embodiments. The presentation conditioner applies a block filter to the median filtered baseline factor waveform in step 142 to generate a final baseline factor waveform. The block filter sets all median filtered baseline factor waveform values for each sample point to 0 unless the sample point is in a consecutive run of 30 sample points, all of which have baseline factor waveform values of 1 in which case the values remain 1. Other embodiments use other run lengths. In step 144, the presentation conditioner 30 multiplies the high-pass bi-directionally filtered attenuation compensated waveform values by the baseline factor waveform values to get a raw reflection baseline waveform as further discussed above in connection with FIG. 16. The presentation conditioner 30 then applies a 200 KHz bi-directional low pass filter to the raw reflection waveform in step 146 to obtain a reflection baseline waveform further discussed above in connection with FIG. 16 and then ends execution in step 148. The reflection baseline waveform is subsequently used by the presentation conditioner in further processing as previously discussed.

The baseline distortion removal processor 32 removes a baseline due to anomalies from the reflection waveform in order for processors such as the attenuation determiner 34 and the signal-to-noise determiner 36 to determine attenuation and signal-to-noise, respectively, for the reflection waveform. Other processors in other embodiments determine other characteristics of the twisted pair line 2 based upon the results of the baseline processor. The baseline processor 32 uses either an extended baseline method illustrated by the flowchart of FIG. 19 or a mirrored baseline method illustrated by the flowchart of FIG. 23 depending upon the particular twisted pair line 2 being tested. The extended baseline method is used more when the slope of the reflection waveform near the end reflection (e.g. P2 of the reflection waveform of FIG. 12) is relatively steep. The mirrored baseline method is generally used for twisted pair lines 2 which have relatively shallow slopes of the reflection waveform near the end reflection.

Figure 19:
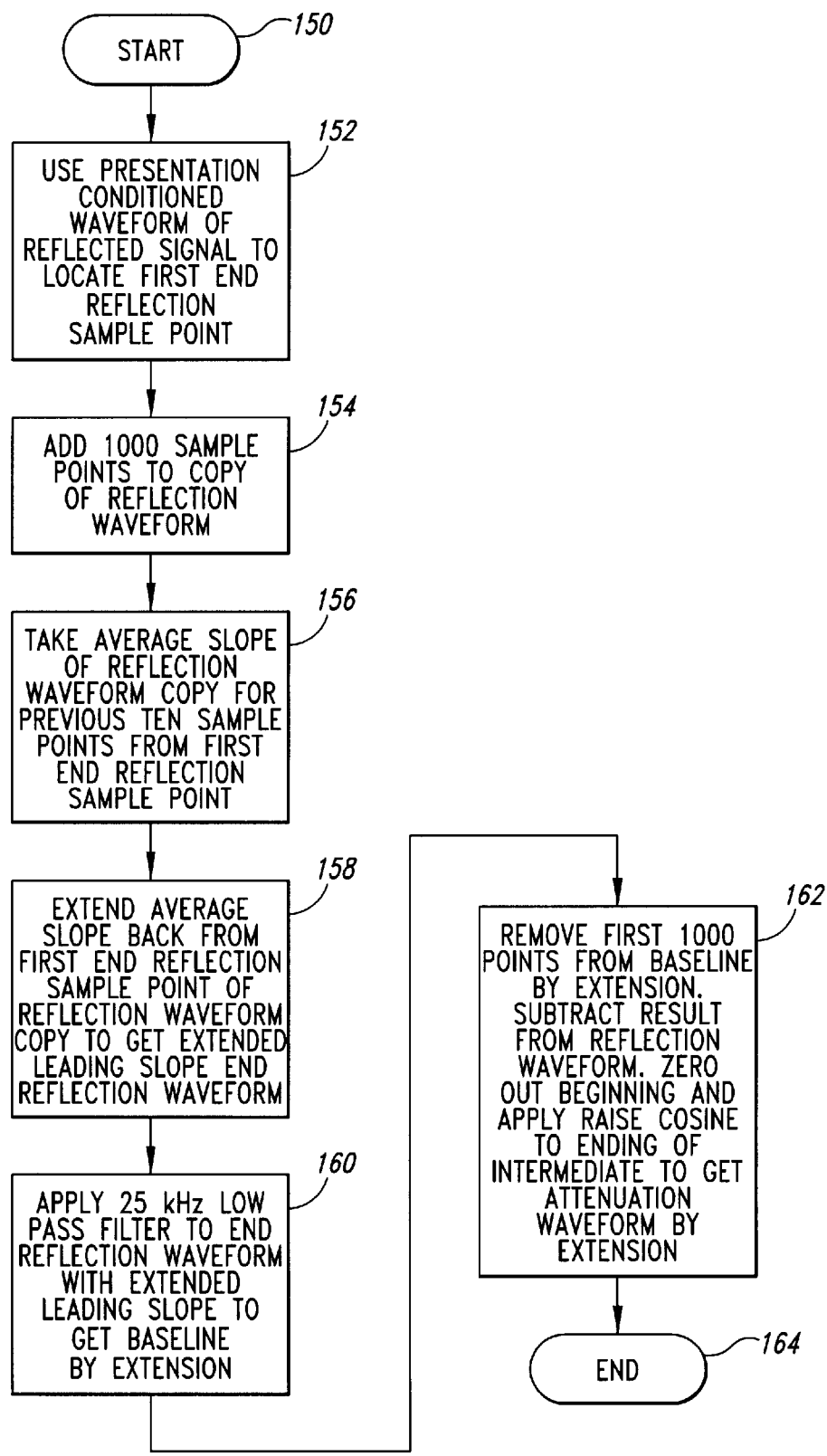
FIG. 19 is a flowchart illustrating a method performed by a baseline distortion removal processor of the test apparatus embodiment of FIG. 6.

For the extended baseline method, the baseline distortion removal processor 32 starts at 150 of FIG. 19. The baseline processor uses the presentation conditioned waveform of the reflected signal to locate the first sample point of the end reflection in step 152. In doing so, the baseline processor 32 first determines the highest peak of the presentation conditioned waveform and then analyzes waveform values of the presentation conditioned waveform previous to the sample point for the highest peak to determine the sample point corresponding to the closest dip before the highest peak. For example, as illustrated by the graph in FIG. 18, the label D1 indicates the closest dip to the highest peak, P2, of the presentation conditioned waveform. FIG. 18 is further discussed above with the general discussion of the display presentation conditioner 30. This sample point corresponding to the closest dip is the first sample point of the end reflection. If no dip exists the baseline processor selects an estimated point based on the slope of the end reflection.

After determining the first sample point of the end reflection, starting with step 154, the baseline processor 32 uses the reflection waveform rather than the presentation conditioned waveform since the presentation conditioned waveform is only used in this case to determine the first end reflection sample point. The reflection waveform will be used by the baseline processor 32 for actual isolation of the portion of the reflection waveform due to reflection from the termination end of the twisted pair line 2.

In step 154, the baseline processor 32 adds 1000 points to the front end of a copy of the reflection waveform to create a right shift of the waveform by 1000 sample points. The addition of the 1000 points helps in manipulation of the waveforms. The particular number of points added to the waveform can be varied and the step of adding the number of points is not essential. The following steps are performed to generate a baseline that will contain the baseline distortion for the end reflection portion of the reflection waveform. The resultant baseline can then be used to remove the baseline distortion from the end reflection portion of the reflection waveform.

In step 156, the baseline processor 32 then takes the average slope of the reflection waveform copy for the previous ten sample points from the first end reflection sample point of the reflection waveform copy. In step 158, the baseline processor 32 extends the average slope back from the first end reflection sample point of the reflection waveform copy to get an extended leading slope end reflection waveform. In step 160, the baseline processor 32 then applies a 25 KHz bi-directional low pass filter to the extended leading slope end reflection waveform to get a baseline by extension.

Figure 20:
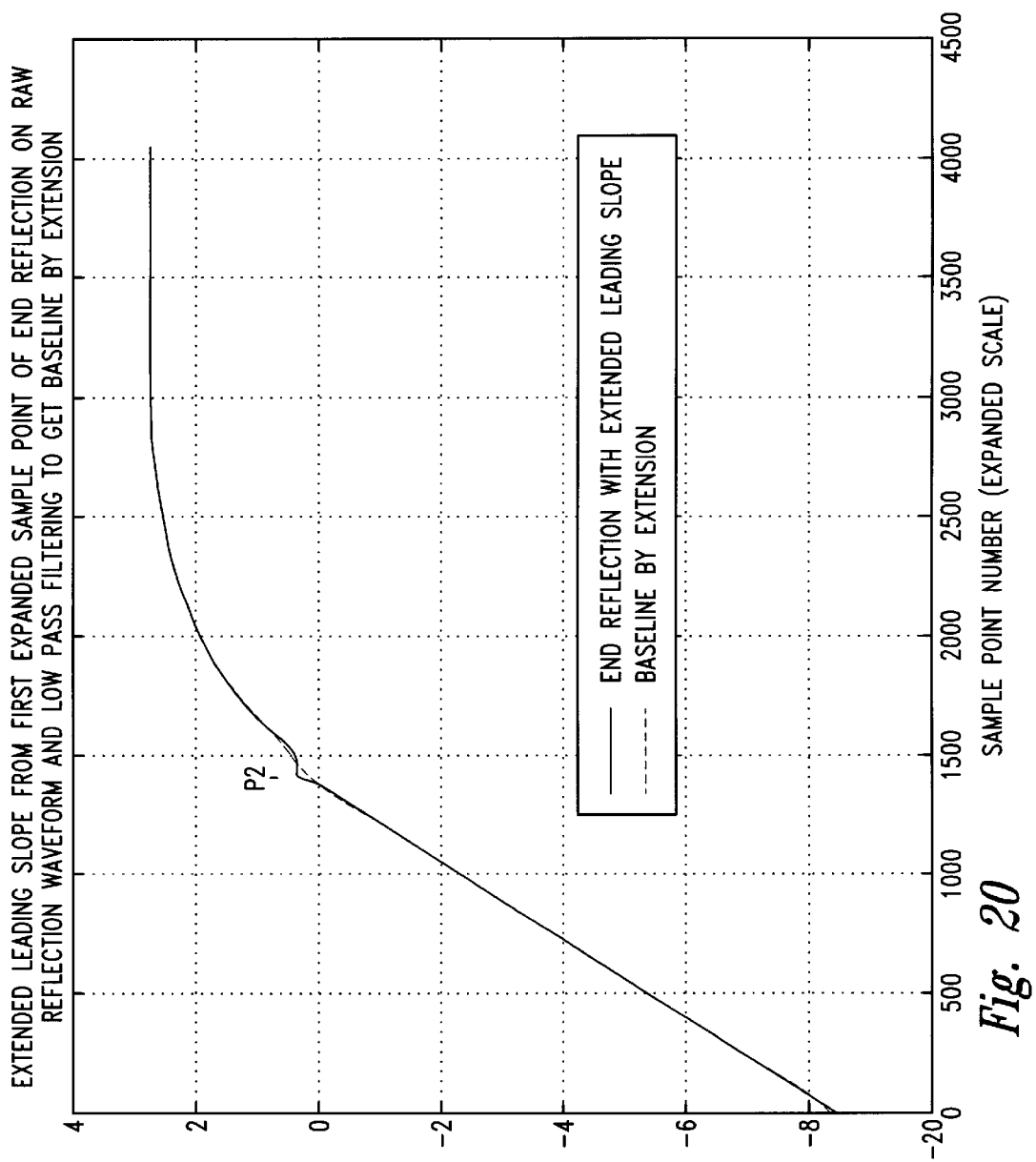
FIGS. 20–22 are graphs of signal waveforms illustrating affects of steps performed according to the method illustrated by the flowchart of FIG. 19.
Figure 21:
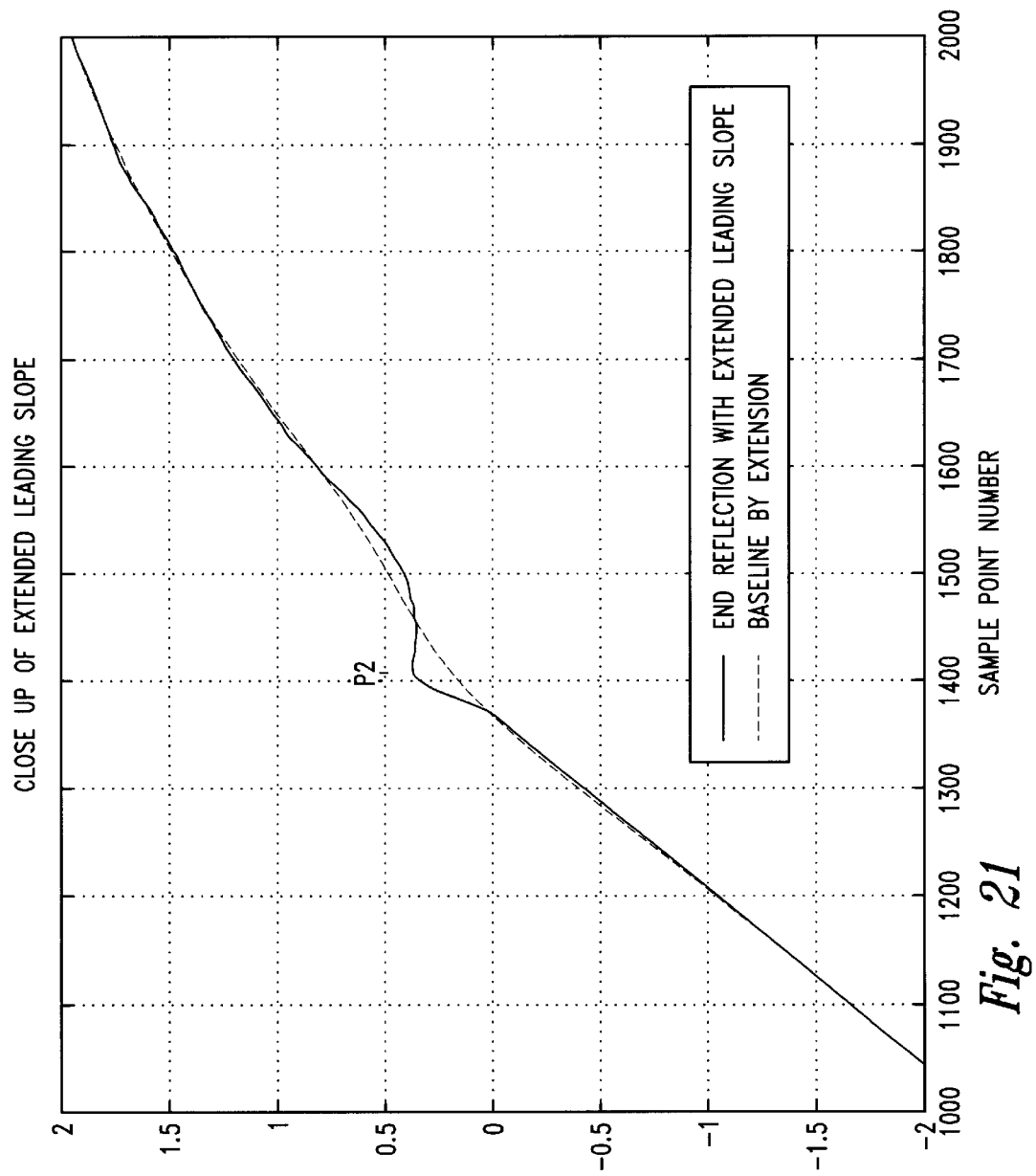

The graphs of FIGS. 20 and 21 illustrate the results of extending a slope back from the first sample point of the end reflection in step 158 and then low-pass filtering. The vertical axis of the graphs of FIGS. 20 and 21 indicate signal magnitude and the horizontal axis of the graphs of FIGS. 20 and 21 indicate corresponding sample points of the displayed waveforms. As shown by the graphs of FIGS. 20 and 21, the result of the low-pass filtering does not affect the beginning portion of the waveform where the extended slope exists. The extended slope portion of the extended leading slope end reflection waveform is substantially the same as the extended slope portion of the baseline by extension. Thus, what differs between these two waveforms is the end reflection portion of the waveforms. The baseline by extension represents effects in its end reflection portion due directly to distortion of the original reflection waveform.

The baseline processor 32 in step 162 first removes the 1000 points initially added to the beginning of the reflection waveform from the baseline by extension. The resulting waveform is then subtracted from the reflection waveform to get an intermediate waveform. The baseline processor 32 zeroes out all values of the intermediate waveform up until the beginning of the peak of the end reflection and then applies a raised cosine taper function to the trailing edge of the end reflection of the intermediate waveform to reduce noise and artifacts unrelated to waveform reflection. The resultant waveform after step 162 is an attenuation waveform by extension. The baseline processor then ends the extended baseline method in step 164.

Figure 22:
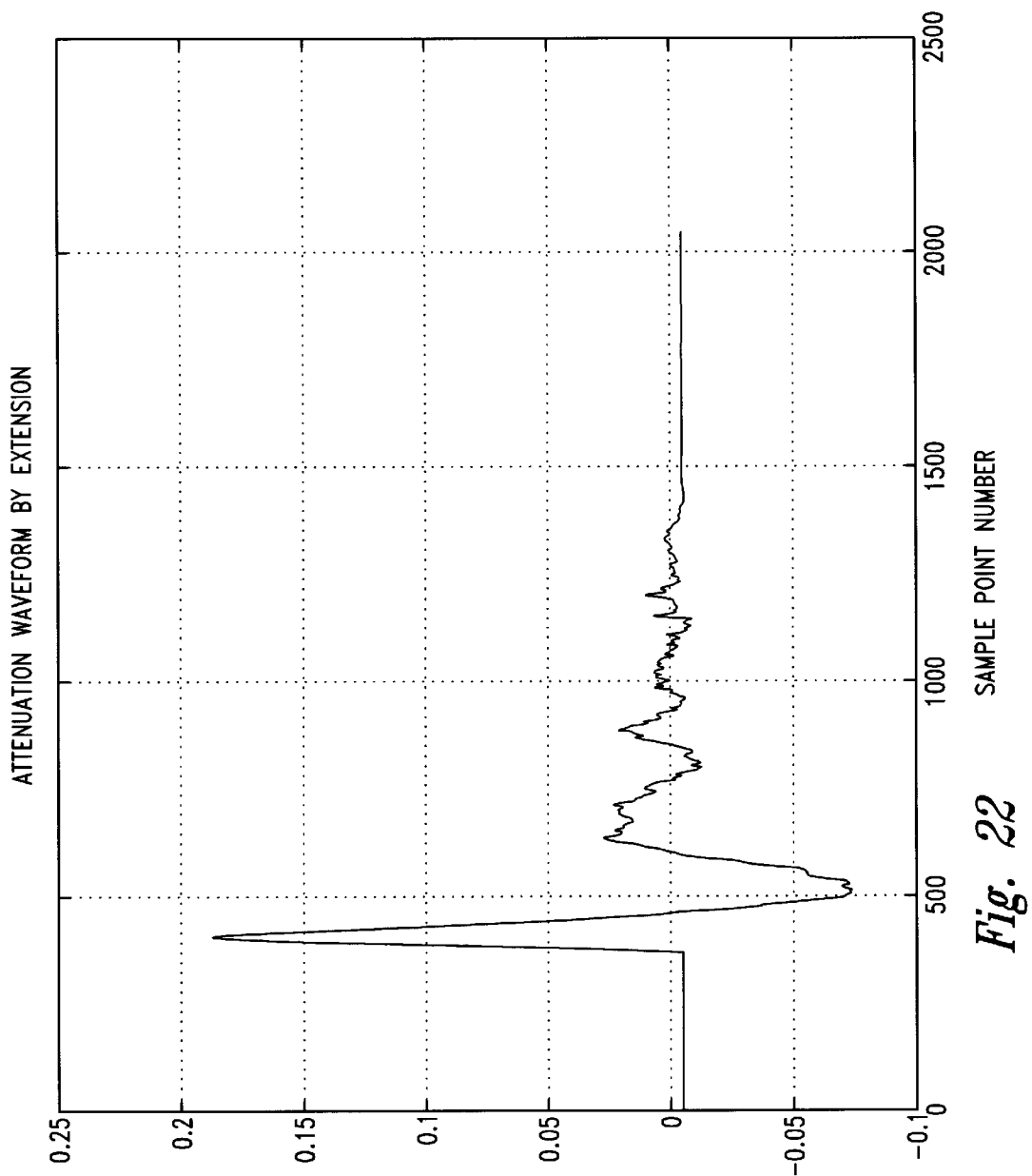

The graph of FIG. 22 illustrates the results of the steps of 162 by showing the attenuation waveform by extension. The vertical axis of the graph of FIG. 22 indicates signal magnitude and the horizontal axis of the graph of FIG. 22 indicates corresponding sample points of the displayed waveforms. As shown by the graph of FIG. 22, the attenuation waveform by extension has signal values only for the end reflection portion. Processors such as the attenuation determiner 34 then use the attenuation waveform by extension for subsequent analysis.

Figure 23:
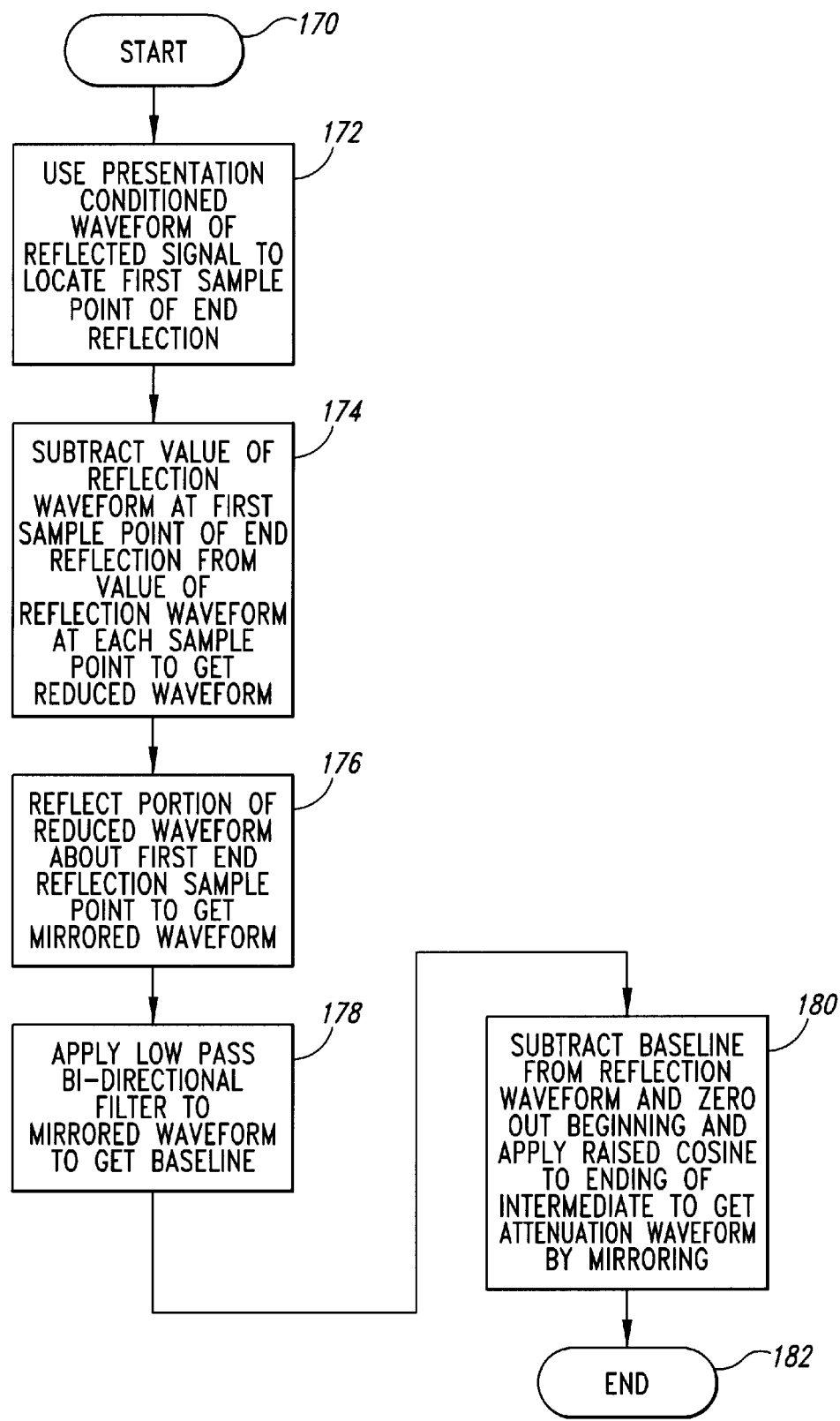
FIGS. 23 is a flowchart illustrating a method performed by a baseline distortion removal processor of the test apparatus embodiment of FIG. 6.
Figure 24:
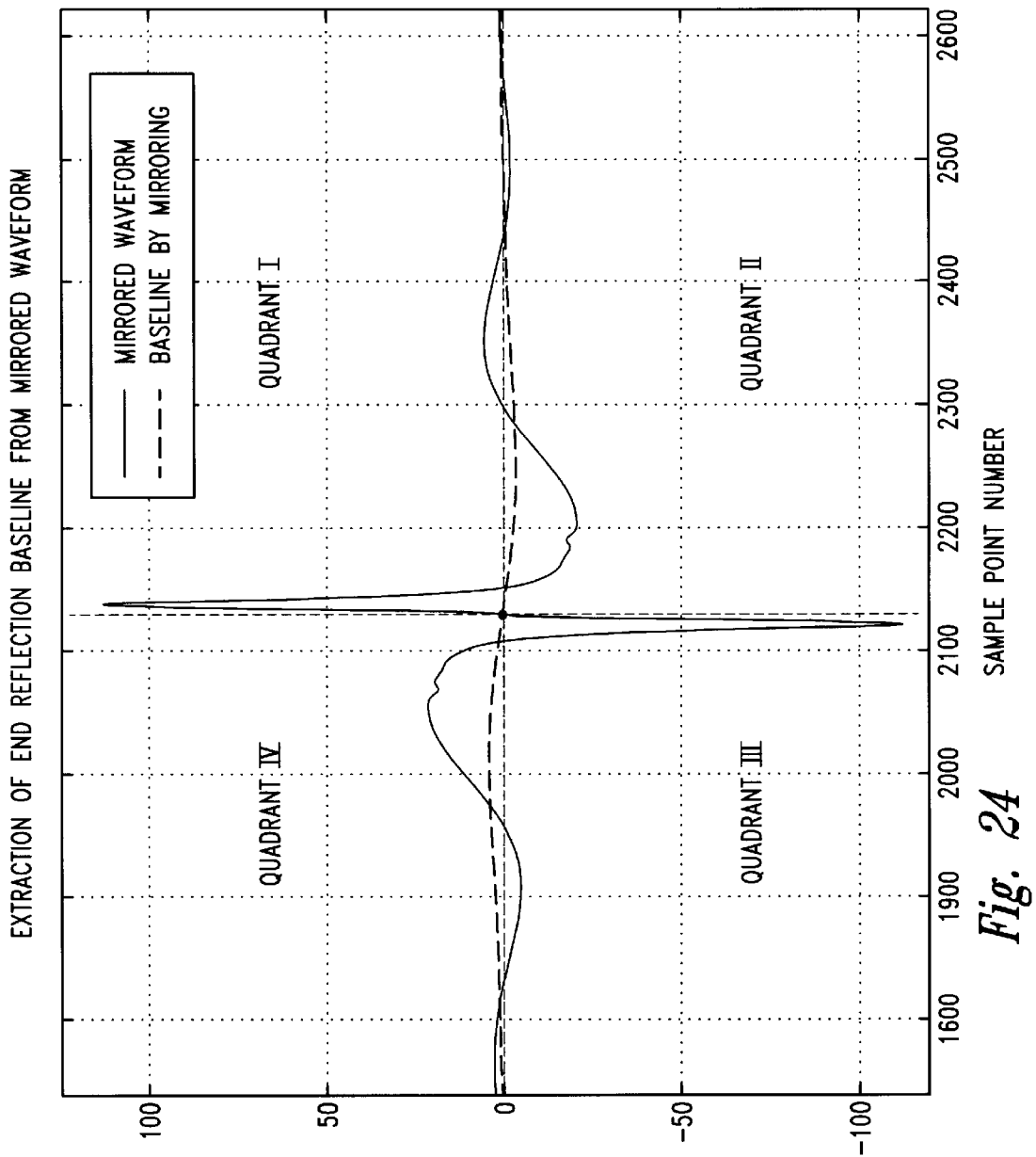
FIGS. 24–26 are graphs of signal waveforms illustrating affects of steps performed according to the method illustrated by the flowchart of FIG. 23.

As discussed above, if the end reflection of twisted pair line 2 has a gradual slope, the baseline processor 32 uses a mirrored baseline method that starts at step 170 of FIG. 23. The baseline processor uses the presentation conditioned waveform of the reflected signal to locate the sample point for the first end reflection sample point in step 152, as described above for the extended baseline method. Next, in step 174, the baseline processor adds 2044 sample points to the beginning of a copy of the reflection waveform to create a right shift of the waveform by 2044 sample points. Also in step 174, the baseline processor subtracts the value of the reflection waveform at the first end reflection sample point from each value of the shifted waveform to get a reduced waveform. After step 174, the baseline processor in step 176 copies the original portion of the reduced waveform that follows the first end reflection sample point. The baseline processor then reflects the copy about the first end reflection sample point, as shown in FIG. 24, to get a reflection portion. To further explain the reflection process, FIG. 24 has been broken into four quadrants by dashed lines. Before and after reflection, the original portion occupies quadrants I and II of FIG. 24. After reflection, the reflection portion occupies quadrants III and IV. The quadrant III reflection portion is a copy of the quadrant I original portion and the quadrant IV reflection portion is a copy of the quadrant II original portion. The end result of this reflection process is a mirrored waveform. The mirrored waveform is mirrored both vertically and horizontally about the initial end reflection sample point.

After reflection, the baseline processor 32 applies a low pass bi-directional filter to the mirrored waveform, in step 178, to obtain a baseline by mirroring, which is also shown in FIG. 24. Next, in step 180, the baseline processor 32 first removes the initial 2044 sample points from the baseline by mirroring. The result is shown along with the reflection waveform in FIG. 25. The baseline processor 32 then subtracts the baseline by mirroring from the original reflection waveform in step 180 to obtain an intermediate waveform. The baseline processor zeroes out the beginning points of the intermediate waveform before the first end reflection sample point and applies a raised cosine taper function to end portion of the intermediate waveform to reduce noise and artifacts unrelated to the end reflection, resulting in an attenuation waveform by mirroring. The baseline processor 32 then ends the mirrored baseline method at step 182. Processors such as the attenuation determiner 34 then use the attenuation waveform by mirroring for subsequent analysis.

Figure 25:
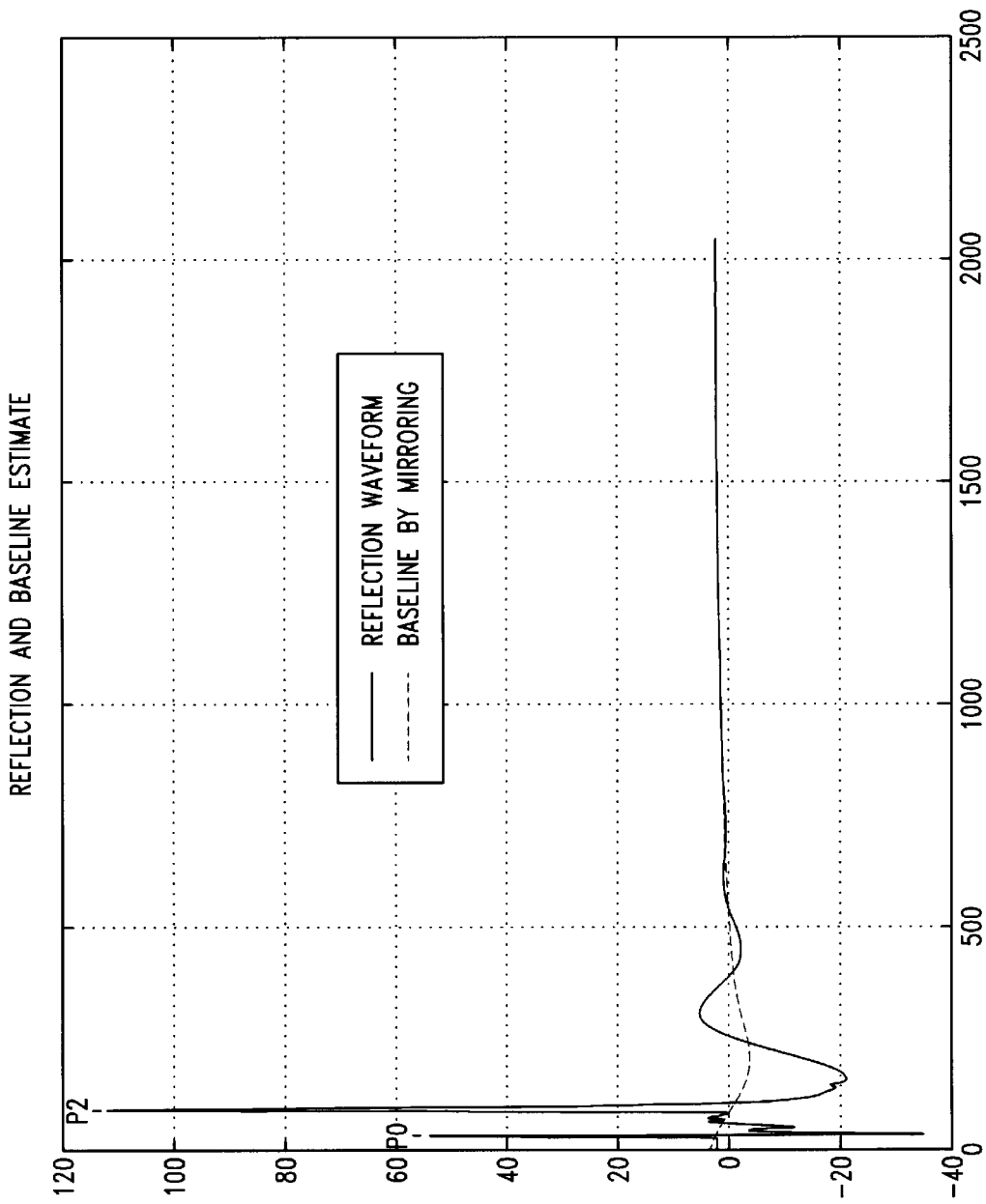
Figure 26:
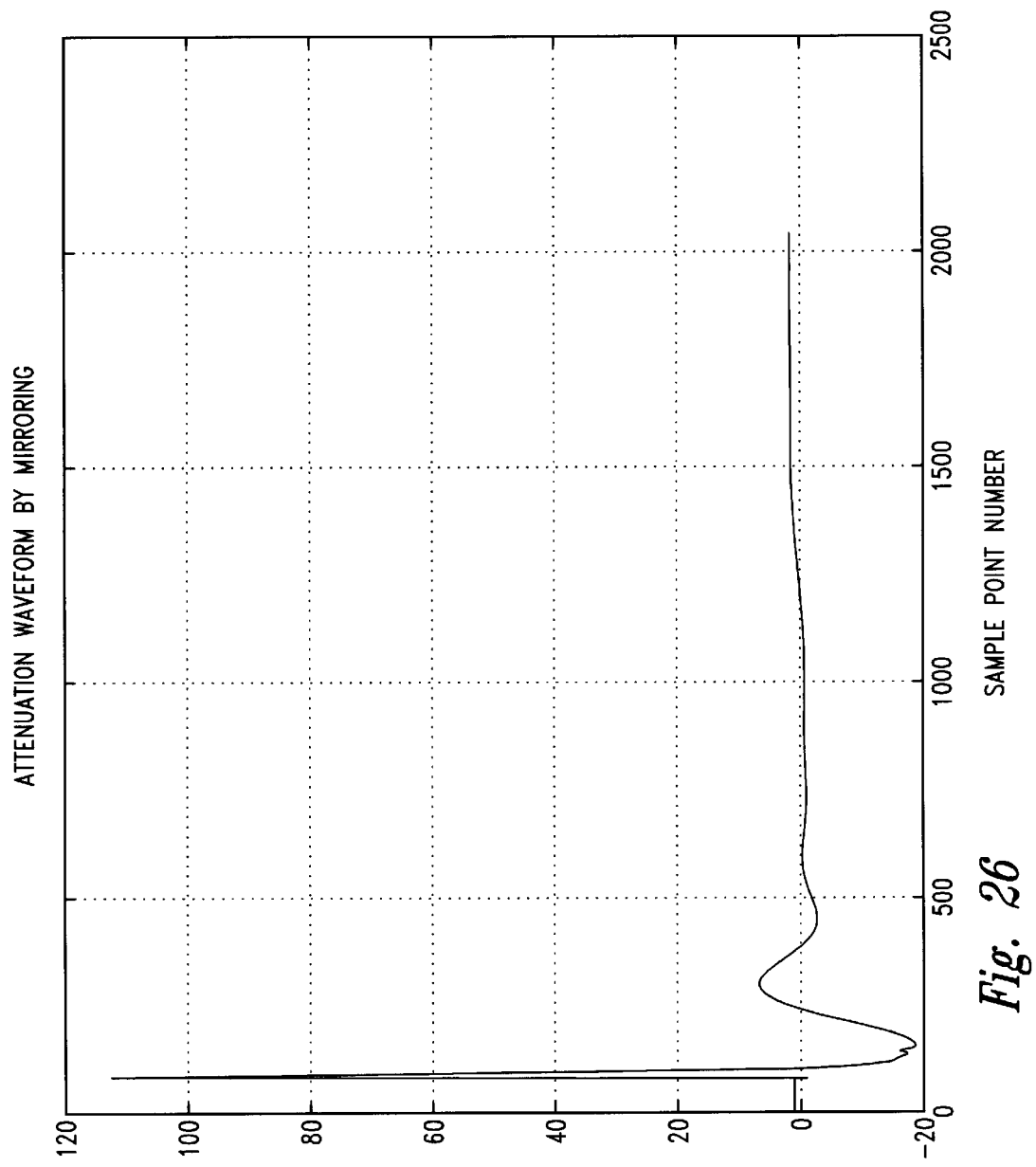

The twisted pair line 2 used for FIGS. 24–26 is shorter than that used for the previous figures so the end reflection occurs at a lower sample point number than previous figures. Also, for FIGS. 24–26, there is no bridged tap 2a in the twisted pair line so there is no peak between the initial transmission peak, P0, and the end reflection peak, P2.

The graphs of FIGS. 25 and 26 illustrate the results of steps 170–182 by showing the reflection waveform and baseline by mirroring in FIG. 25 and the attenuation waveform by mirroring in FIG. 26. The vertical axis of the graphs of FIGS. 25 and 26 indicates signal magnitude and the horizontal axis of the graphs of FIGS. 25 and 26 indicates corresponding sample points of the displayed waveforms. As shown by the graphs of FIGS. 25 and 26, the baseline by mirroring contains relatively larger signal values in its portion corresponding to the end reflection portion of the reflection signal.

The open/short processor 38 processes the reflection waveform independent from the presentation conditioner 30 and the baseline processor 32. The open/short processor 38 takes advantage of a physical phenomenon in which a signal that is reflected from a shorted end of twisted pair line will be negated in sign. Shorting of an end of twisted pair line is accomplished by electrically coupling the two wires of a twisted pair line 2 together at the termination end 6. A signal reflected from an open end of twisted pair line will maintain the original sign of the signal values. The termination end of a twisted pair line is open when the two twisted pair wires are unterminated so that they are not electrically coupled together at the termination end of the twisted pair line. For an ideal condition with no noise, anomalies, or attenuation on a twisted pair line, a signal reflected from a shorted line is identical to its original transmitted signal except that the sign for each value of the reflected signal is opposite that of the original transmitted signal. For the ideal condition, a signal reflected from an open end is identical to the original transmitted signal.

Figure 27:
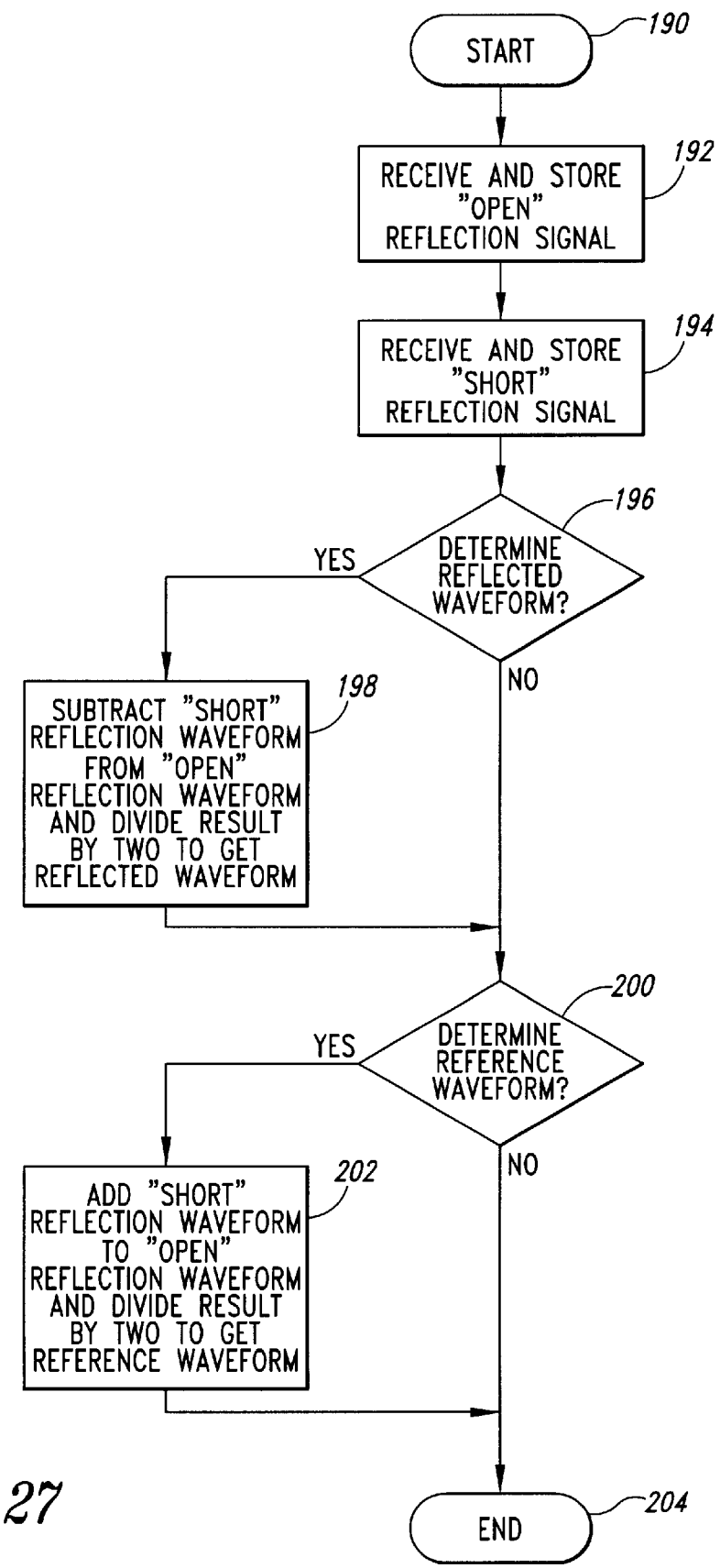
FIG. 27 is a flowchart illustrating a method performed by an open/short processor of the test apparatus embodiment of FIG. 6.

The open/short processor 38 determines either attenuation or anomaly characteristics of a twisted pair line using the method illustrated in FIG. 27 starting at step 190. At step 192, the open/short processor 38 receives and stores an open reflection signal from an original transmission signal reflected from an open termination end of the twisted pair line 2. Then, in step 194, the open/short processor receives and stores a short reflection signal from an original transmission signal having substantially the same waveform as the open reflection measurement original transmission signal reflected from a shorted termination end of the twisted pair line 2.

In step 196, if the open/short processor 38 is not to determine the waveform of the reflected signal for further attenuation analysis, the open/short processor branches under a "no" condition to step 200 and otherwise branches under a "yes" condition to step 198. In step 198, the open/short processor 38 subtracts the short reflection signal from the open reflection signal and divides by two to get a reflected waveform. The reflected waveform is then used along with the original transmission signal by the attenuation determiner 34 to determine attenuation for the twisted pair line 2.

The open/short processor 38 determines at step 200 whether the open/short processor 38 will determine the reference waveform of the twisted pair line 2. Under a "no" condition, the method branches to step 204 and otherwise branches under a "yes" condition to step 202. In step 202, the open/short processor 38 adds the open reflection signal to the shorted reflection signal and divides by 2 to obtain the reference waveform. Typically, the reference waveform is particular to the twisted pair line 2 being tested and is thus better used with twisted pair lines that have similar capacitance and attenuation characteristics as the one tested. The open/short processor 38 of line tester 8 subtracts the reference waveform from reflection waveforms received by the line tester to obtain reflected waveforms as they would look without anomalies introduced by the tester 8. This might be used as an alternate to using the baseline distortion removal processor 32.

Each of the circuit components described in connection with FIGS. 5 and 6 is of a type known in the art, and one skilled in the art would be able to use such circuit components or provided software in the described combination to practice the invention. The internal details of these particular circuit components or software are not part of, nor critical to, the invention. Therefore, a detailed description of the internal operation of these circuit components or software has been omitted for the sake of brevity. Similarly, each of the steps depicted in FIGS. 9–11, 19, 23, and 27 is of a type well known in the art and may itself include a sequence of operations which need not be described herein.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. A communication line tester for testing a communication line comprising:
   a transmitter electrically coupled to the communication line;
   an analog-to-digital converter electrically coupled to the communication line;
   a main processor electrically coupled to the analog-to-digital converter, the main processor comprising:
      a pseudo-random code processor configured to generate pseudo-random coded signals for transmission by the transmitter on to the communication line and to decode pseudo-random coded signals received by the main processor from the analog-to-digital converter; and
      a multiple waveform based distortion removal processor configured to remove distortion produced by imperfect operation of tester components coupled to the communication line from signals based on a plurality of signals received from the analog-to-digital converter, the distortion removal based on a plurality of coded signals generated by the pseudo-random code processor.

2. The line tester of claim 1 wherein the main processor further comprises an even-order distortion removal processor configured to remove even order distortion produced by imperfect operation of tester components coupled to the communication line from signals received from the analog-to-digital converter based on cross correlation involving an original signal and a reflected signal of the original signal, and based on cross correlation involving an inverted original signal, and a reflected signal of the inverted original signal.

3. The line tester of claim 1 wherein the multiple waveform based distortion removal processor selects the plurality of coded signals of the plurality of coded signals to maximize distortion reduction.

4. The line tester of claim 1 wherein the pseudo-random code processor generates pseudo-random coded signals based on maximal length sequences.

5. A communication line tester for testing a communication line comprising:

a transmitter electrically coupled to the communication line;

an analog-to-digital converter electrically coupled to the communication line;

a main processor electrically coupled to the transmitter and the analog-to digital converter, the main processor comprising:

a pseudo-random code processor configured to generate pseudo-random coded signals for transmission by the transmitter on to the communication line and to decode pseudo-random coded signals received by the main processor from the analog-to-digital converter; and an even-order distortion removal processor configured to remove even order distortion produced by the imperfect operation of tester components coupled to the communication line from signals received from the analog-to-digital converter based on cross correlation involving an original signal and a reflected signal of the original signal, and based on cross correlation involving an inverted original signal, and a reflected signal of the inverted original signal.

6. The communication line tester of claim 5 wherein the main processor further comprises a multiple waveform based distortion removal processor configured to remove distortion produced by the imperfect operation of tester components from signals received from the analog-to-digital converter the distortion removal based on a plurality of coded signals generated by the pseudo-random code processor.

7. The communication line tester of claim 5 wherein the even-order distortion removal processor is configured to cross correlate an original signal with a reflected signal of the original signal, and cross correlate an inverted original signal with a reflected signal of the inverted original signal.

8. The communication line tester of claim 5 wherein the even-order distortion removal processor is configured to add the cross correlation involving an original signal and a reflected signal of the original signal to the cross correlation involving an inverted original signal, and a reflected signal of the inverted original signal.

9. The line tester of claim 5 wherein the pseudo-random code processor generates pseudo-random coded signals based on maximal length sequences.

10. A communication line tester for testing a communication line comprising:

a transmitter electrically coupled to the communication line;

an analog-to-digital converter electrically coupled to the communication line;

a display presentation processor coupled to the transmitter and the analog-to digital converter, the display presentation processor comprising:

an attenuation compensator configured to process signals received from the analog-to-digital converter to generate attenuation compensated waveforms by compensating for attenuation in the communication line, the attenuation compensator configured to add differences in signal values between adjacent sample points each multiplied by multiplication factors to the signals being processed; and a reflection baseline waveform determiner configured to generate a reflection baseline waveform based on attenuation compensated waveforms, the reflection baseline waveform determiner configured to determine differences in signal values related to the attenuation compensated waveforms for pairs of sample points to generate an intermediate difference waveform, the reflection baseline waveform determiner configured to generate a baseline factor waveform value based upon thresholding of the intermediate difference waveform, the reflection baseline waveform determiner configured to apply a median filter and a block filter to the baseline factor waveform to generate a final baseline factor waveform, the reflection baseline waveform determiner configured to generate the reflection baseline waveform based on the final baseline factor waveform and the attenuation compensated waveform.

11. The communication line tester of claim 10 wherein the display presentation processor is further configured to high-pass bi-directional filter the signals received from the analog-to-digital converter before processing by the attenuation compensator.

12. The communication line tester of claim 10 wherein the display presentation processor is further configured to high-pass bi-directional filter the attenuation compensated waveforms used by the reflection baseline waveform determiner.

13. The communication line tester of claim 10, further comprising:

a pseudo-random code processor configured to generate pseudo-random coded signals for transmission by the transmitter on to the communication line and to decode pseudo-random coded signals received from the analog-to-digital converter.

14. A communication line tester for testing a communication line comprising:

a transmitter electrically coupled to the communication line;

an analog-to-digital converter electrically coupled to the communication line; and a baseline distortion removal processor configured to remove distortions from signals received from the analog-to-digital converter based upon first end reflection sample points of the received signals.

15. A communication line tester for testing a communication line having an end comprising:

a transmitter electrically coupled to the communication line; and an analog-to-digital converter electrically coupled to the communication line;

an open/short processor configured to generate a comparison signal based on an open signal and a short signal, the open signal being reflected when the end of the communication line is unterminated and the short signal being reflected when the end of the communication line is shorted.

16. The communication line tester of claim 15 wherein the open/short processor generates the comparison signal based on a difference of the open signal and the short signal.

17. The communication line tester of claim 15 wherein the open/short processor generates the comparison signal based on a sum of the open signal and the short signal.

18. A method for removing distortion from signals, the method comprising:

transmitting a pseudo-random coded signal;

receiving reflected signals based on the original transmitted signal;

cross-correlating based on the transmitted and reflected signals to generate an original cross-correlation;

inverting the transmitted signal to generate an inverted signal;

transmitting the inverted signal;
receiving a reflected signal based on the inverted signal;
cross-correlating based on the transmitted inverted signal and the received inverted signal to generate an inverted cross-correlation; and
summing the original and inverted cross-correlations to generate a distortion reduced signal.

19. A method for removing distortion from signals, the method comprising:
transmitting a plurality of pseudo-random coded signals;
receiving a plurality of reflected signals based on the transmitted signals;
averaging the plurality of reflected signals to generate an average signal;
generating a plurality of difference signals by taking differences between the average signal and a plurality of signals based on the plurality of reflected signals;
generating a range average signal based on an average of minimum and maximum values of the plurality of difference signals for each particular sample point of a collection of sample points; and
subtracting the range average signal from the average signal to generate a distortion reduced signal.

20. The method of claim 19, further comprising:
generating a plurality of pseudo-random coded signals to be transmitted based on maximal length sequences.

21. The method of claim 19 wherein each pair of pseudo-random coded signal of the plurality of pseudo-random coded signals transmitted and reflected signal based on the transmitted signal, the method further comprises:
cross-correlating based on the transmitted and reflected signals to generate an original cross-correlation;
inverting the transmitted signal to generate an inverted signal;
transmitting the inverted signal;
receiving a reflected signal based on the inverted signal;
cross-correlating based on the transmitted inverted signal and the received inverted signal to generate an inverted cross-correlation; and
summing the original and inverted cross-correlations to generate a distortion reduced signal wherein the distortion reduced signal is one of the plurality of signals based on the plurality of reflected signals.

22. A method for conditioning a received signal for presentation, the method comprising:
high pass filtering the received signal;
compensating for attenuation of the received signal by a communication line to generate an attenuation compensated waveform;
high pass filtering the attenuation compensated waveform;
determining a reflection baseline waveform based on the filtered attenuation compensated waveform;
subtracting the reflection baseline waveform from the attenuation compensated waveform to generate a baseline removed reflection waveform; and
high pass filtering the baseline removed reflection waveform to generate a presentation conditioned waveform.

23. The method of claim 22 wherein the step of high pass filtering the received signal uses a 45 kHz high-pass bi-directional filter.

24. The method of claim 22 wherein the step of compensating further comprises:

determining for each adjacent pair of a collection of sample points of the filtered received signal a difference between the first value of the pair and the second value of the pair;
multiplying each difference by a multiplication factor based on one of the sample points of the pair to generate a compensation term for each sample point; and
cumulatively adding the compensation terms to generate an attenuation compensated waveform.

25. The method of claim 22 wherein the step of determining a reflection baseline waveform further comprises:
determining for each adjacent pair of a collection of sample points of the attenuation compensated waveform a difference between the first value of the pair and the second value of the pair;
setting a baseline factor corresponding to one sample point for each pair of sample points based on whether the absolute difference for the pair is greater than a threshold to generate a baseline factor waveform;
median and block filtering the baseline factor waveform;
multiplying the filtered attenuation compensated waveform by the baseline factor waveform to generate a raw reflection baseline waveform; and
low pass filtering the raw reflection baseline waveform to generate a reflection baseline waveform.

26. A method of reducing baseline distortion from a received signal, the method comprising:
locating the sample point related to the first end reflection sample point of the received signal;
taking an average slope back from the related sample point;
extending the average slope back from the related sample point to generate a leading slope waveform;
low pass filtering the leading slope waveform to generate a baseline waveform; and
subtracting the baseline waveform from the received waveform to reduce baseline distortion of the received signal.

27. A method of reducing baseline distortion from a received signal, the method comprising:
locating the sample point related to the first end reflection sample point of the received signal;
subtracting the value of the received signal at the related sample point from the received signal at each sample point to generate a reduced waveform;
reflecting portions of the reduced waveform about the related sample point to generate a mirrored waveform;
low pass filtering the mirrored waveform to generate a baseline waveform; and
subtracting the baseline waveform from the received waveform to reduce baseline distortion from the received signal.

28. A method of generating a comparison signal, the method comprising:
configuring a end of a transmission line to be either open or shorted for a first configuration;
transmitting a first signal on to the transmission line;
receiving a reflected first signal from the transmission line;
configuring the end of the transmission line to be open if the first configuration was shorted and to be shorted if the first configuration was open;

transmitting a second signal on to the transmission line;

receiving a reflected second signal from the transmission line; and comparing the first and second signal to generate the comparison signal.

29. The method of claim 28 wherein the step of comparing comprises determining a difference between the first and second signals.

30. The method of claim 28 wherein the step of comparing comprises determining a sum of the first and second signals.

31. A communication line tester for testing a communication line comprising:

a transmitter electrically coupled to the communication line;

an analog-to-digital converter electrically coupled to the communication line;

a main processor electrically coupled to the analog-to-digital converter, the main processor comprising:

a pseudo-random code processor configured to generate pseudo-random coded signals for transmission by the transmitter on to the communication line and to decode pseudo-random coded signals received by the main processor from the analog-to-digital converter; and a multiple waveform based distortion removal processor configured to remove distortion produced by imperfect operation of tester components coupled to the communication line from signals based on a plurality of signals received from the analog-to-digital converter and on a plurality of coded signals generated by the pseudo-random code processor, the multiple waveform based distortion removal processor being configured to generate a plurality of difference waveforms based on an average waveform of the plurality of signals received, the distortion removal processor being configured to high-pass filter the plurality of difference waveforms and to generate an average of maximum and minimum values of the plurality of difference waveforms based on signals received from the analog-to-digital converter to produce a distortion reduced waveform.

32. The line tester of claim 31 wherein the main processor further comprises an even-order distortion removal processor configured to remove even order distortion produced by imperfect operation of tester components coupled to the communication line from signals received from the analog-to-digital converter based on cross correlation involving an original signal and a reflected signal of the original signal, and based on cross correlation involving an inverted original signal and a reflected signal of the inverted original signal.

33. The line tester of claim 31 wherein the multiple waveform based distortion removal processor selects the plurality of coded signals of the plurality of coded signals to maximize distortion reduction.

34. The line tester of claim 31 wherein the pseudo-random code processor generates pseudo-random coded signals based on maximal length sequences.

35. The line tester of claim 31 wherein the multiple waveform based distortion removal processor is further configured to subtract the average of maximum and minimum values of the plurality of difference waveforms from the average waveform of the plurality of signals received.

36. A communication line tester for testing a communication line comprising:

a transmitter electrically coupled to the communication line;

an analog-to-digital converter electrically coupled to the communication line;

a main processor electrically coupled to the transmitter and the analog-to-digital converter, the main processor comprising:

a pseudo-random code processor configured to generate pseudo-random coded signals for transmission by the transmitter on to the communication line and to decode pseudo-random coded signals received by the main processor from the analog-to-digital converter; and an even-order distortion removal processor configured to remove even order distortion produced by the imperfect operation of tester components coupled to the communication line from signals received from the analog-to-digital converter based on cross correlation involving an original signal and a reflected signal of the orignal signal, and based on cross correlation involving an inverted original signal, and a reflected signal of the inverted original signal the even-order distortion removal processor further being configured to subtract the reflected signal of the inverted original signal from the reflected signal of the original signal to generate a difference signal, being configured to divide the difference signal by two to generate a divided result, and being configured to cross-correlate the divided result with the original signal.

37. The communication line tester of claim 36 wherein the main processor further comprises a multiple waveform based distortion removal processor configured to remove distortion produced by the imperfect operation of tester components from signals received from the analog-to-digital converter, the distortion removal based on a plurality of coded signals generated by the pseudo-random code processor.

38. The communication line tester of claim 36 wherein the even-order distortion removal processor is configured to cross correlate an original signal with a reflected signal of the original signal, and cross correlate an inverted original signal with a reflected signal of the inverted original signal.

39. The communication line tester of claim 36 wherein the even-order distortion removal processor is configured to add the cross correlation involving an original signal and a reflected signal of the original signal to the cross correlation involving an inverted original signal, and a reflected signal of the inverted original signal.

40. The line tester of claim 36 wherein the pseudo-random code processor generates pseudo-random coded signals based on maximal length sequences.

41. A communication line tester for testing a communication line comprising:

a transmitter electrically coupled to the communication line;

an analog-to-digital converter electrically coupled to the communication line; and a baseline distortion removal processor configured to remove distortions from signals received from the analog-to-digital converter based upon first end reflection sample points of the received signals, the baseline distortion removal processor being further configured to extend average slopes back from the first end reflection sample points of received signals to generate end reflection waveforms with extended leading slopes, to apply a low pass filter to the end reflection waveforms with extended leading slopes to generate baselines by extension, and to generate intermediate waveforms based on subtraction of the baselines by extension from the end reflection waveforms with extended leading slopes.

42. The communication line tester of claim 41 wherein the baseline distortion removal processor is further configured to generate attenuation waveforms by extension based on zeroing out an initial portion of the intermediate waveform and tapering a final portion of the intermediate waveform.

43. The communication line tester of claim 41 further wherein the baseline distortion removal processor is further configured to generate reduced waveforms based on subtraction of the first end reflection values from the received signals and to generate a mirrored waveform based on reflecting portions of the reduced waveforms about the first end reflection sample points of the received signals to generate mirrored waveforms and to apply low pass filters to the mirrored waveforms to generate baselines by mirroring.

44. The communication line tester of claim 41 wherein the baseline distortion removal processor is further configured to generate attenuation waveforms by mirroring based on subtraction of the baselines by mirroring from the received signals.

45. A communication line tester for testing a communication line comprising:

a transmitter electrically coupled to the communication line:

an analog-to-digital converter electrically coupled to the communication line; and a baseline distortion removal processor configured to remove distortions from signals received from the analog-to-digital converter based upon first end reflection sample points of the received signals, the baseline distortion removal processor being further configured to generate reduced waveforms based on subtraction of the first end reflection values from the received signals, to generate mirrored waveforms based on reflecting portions of the reduced waveforms about the first end reflection sample points of the received signals and to low pass filter the mirrored waveforms to generate baselines by mirroring.

46. The communication line tester of claim 45 wherein the baseline distortion removal processor is further configured to generate attenuation waveforms by extension based on zeroing out an initial portion of the intermediate waveform and tapering a final portion of the intermediate waveform.

47. The communication line tester of claim 45 wherein the baseline distortion removal processor is further configured to generate attenuation waveforms by mirroring based on subtraction of the baselines by mirroring from the received signals.

48. A communication line tester for testing a communication line comprising:

a transmitter electrically coupled to the communication line;

an analog-to-digital converter electrically coupled to the communication line; and a baseline distortion removal processor configured to remove distortions from signals received from the analog-to-digital converter based upon first end reflection sample points of the received signals, the baseline distortion removal processor being further configured to generate attenuation waveforms based on subtraction of the baselines by mirroring from the received signals.

49. The communication line tester of claim 48 wherein the baseline distortion removal processor is further configured to generate attenuation waveforms by extension based on zeroing out an initial portion of the intermediate waveform and tapering a final portion of the intermediate waveform.

* * * * *